(12) United States Patent
Lachnit

(10) Patent No.: US 6,521,279 B2
(45) Date of Patent: Feb. 18, 2003

(54) BAKING DOUGH CONFIGURATION DEVICE AND METHOD

(76) Inventor: Anthony J. Lachnit, 740 S. Oakland Ave., Villa Park, IL (US) 60181

( * ) Notice: Subject to any disclaimer, the term of this patent is extended or adjusted under 35 U.S.C. 154(b) by 0 days.

(21) Appl. No.: 09/976,934

(22) Filed: Oct. 12, 2001

(65) Prior Publication Data

US 2002/0048625 A1 Apr. 25, 2002

Related U.S. Application Data

(62) Division of application No. 09/552,601, filed on Apr. 19, 2000, now Pat. No. 6,303,170.

(51) Int. Cl.[7] .............................. A21D 6/00; B29C 43/00
(52) U.S. Cl. ........................ 426/496; 425/394; 425/398; 426/503; 426/512
(58) Field of Search ................................ 426/496, 503, 426/512, 518, 523; 425/394, 398

(56) References Cited

U.S. PATENT DOCUMENTS 4,511,324 A * 4/1985 Bauer ......................... 425/398
5,547,695 A * 8/1996 Ricke et al. ................. 426/503

* cited by examiner

Primary Examiner—George C. Yeung
(74) Attorney, Agent, or Firm—Cherskoy & Flaynik

(57) ABSTRACT

A baking dough configuration device 10 includes a cutter or first member 12 that removably inserts into a tray or second member 18 having a preselected quantity of baking dough therein. The first member 12 is forcibly urged into the second member 18 until the first member 12 engages a lower wall 19 of the second member 18 thereby cutting or separating the dough in the second member 18 into a predetermined configuration. The first member 12 is then removed from the second member 18 followed by the removal of the dough from the second member 18. The dough maintains its configuration imposed by the first member 12 due to the dimension of the cuts or separations. The dough is then placed in an environmental chamber to allow for the growth of yeast, then baked, resulting in a bread roll having a configuration that is substantially the same as a bread roll derived from baked dough positioned into an "overhand knot" configuration.

30 Claims, 34 Drawing Sheets

BAKING DOUGH CONFIGURATION DEVICE AND METHOD

This application is a Divisional Application of U.S. application, Ser. No. 09/552.601 filed Apr. 19, 2000 now U.S. Pat. No. 6,303,170.

BACKGROUND OF THE INVENTION

1. Field of the Invention

The present invention relates generally to the configuring of baking dough and, more particularly, to bakery dough configuration devices that form or shape bakery dough without manual assistance to provide, after baking, a bread roll having a predetermined configuration corresponding to the configured bakery dough.

2. Background of the Prior Art

Bread rolls and other bakery products are the result of baked dough that has been configured into a predetermined position or form by a person shaping the dough with their hands. One particular bread roll provided in restaurants is depicted in FIG. 1 of the drawings. The corresponding dough form or shape that, upon being baked results in the bread roll of FIG. 1, is depicted in FIG. 2 of the drawings and is termed an "overhand knot" configuration. The overhand knot configuration can only be. accomplished by a person shaping and knotting the dough with their hands.

A disadvantage to this method of providing bread rolls is that it requires excessive amounts of time and manpower to configure the large quantity of dough to make the rolls ultimately consumed in restaurants. Alternative prior art methods of providing the bread rolls, have a person shaping the general form of each piece of dough, then cutting the dough with hand tools (such as knives) into a predetermined configuration that, upon being baked, results in the bread rolls depicted in FIG. 1. This alternative method also requires excessive time and manpower to configure each piece of dough. A need exists for a device that quickly and with minimal manual labor configures a preselected quantity of baking dough that, upon being baked, provides a bread roll having a predetermined configuration. Further, a need exists for connecting a plurality of the dough configuring devices to a machine capable of mass producing the configured pieces of baking dough.

SUMMARY OF THE INVENTION

It is an object of the present invention it provide a baking dough configuration device that overcomes many of the disadvantages of the prior art.

A principle object of the present invention is to provide a baking dough configuration device that cuts baking dough into a predetermined configuration such that, upon being baked, a bread roll results with a configuration substantially the same as the configuration of a bread roll (see FIG. 1) derived from baking dough that has been positioned by a person into an "overhand knot" configuration (see FIG. 2). A feature of the device is a cutter or first member that cuts the baking dough into the predetermined configuration. An advantage of the device is that the baking dough need not be manually positioned in an overhand knot configuration.

Still another object of the present invention is to provide a device that contains a predetermined quantity of baking dough. A feature of the device is a tray or second member that removably receives the predetermined quantity of dough therein. An advantage of the device is that the dough need only be positioned and leveled in the second member thereby eliminating the steps of shaping the dough, then positioning the dough into an overhand knot configuration.

Yet another object of the present invention is to provide a device that is removably secured to a machine that is capable of mass producing the predetermined baking dough configurations. A feature of the device is a machine connection member integrally joined to the first member. Another feature of the device is a plurality of recesses in outer bottom and outer side walls of the second member. An advantage of the device is that first and second members of multiple devices may be connected to a machine that automatically inserts the first members into corresponding second members containing the baking dough in a continuously moving progression thereby providing multiple pieces of dough with the same configuration in a relatively short period of time.

Another object of the present invention is to provide a device that provides quick connect and disconnect capability between the second member and the mass production machine. A feature of the device is a connecting ring that removably receives an annular flexible rim of the second member that expands upon forcibly engaging a cooperating ridge of the connecting ring. An advantage of the device is that the second member is manually forced to a position that inserts a protruding lip of the rim of the second member into a recess in the connecting ring, thus securing the position of the second member until removed by manual force.

Briefly, the invention provides a baking dough configuration device comprising a first member having a cylindrical portion integrally joined to an arcuate portion; and a second member having a frusto-conical, asymmetric configuration that includes short and long side portions and a frustum portion therebetween, said second member being dimensioned to removably receive a predetermined quantity of bakery dough that covers said frustum portion and a substantial part of said short and long side portions, said second member removably receiving said first member after positioning the bakery dough in said second member, said first member being positioned in relation to said second member such that said cylindrical portion of said first member is axially and perpendicularly aligned with said frustum portion of said second member, and such that said arcuate portion of said first member is adjacent to said long side portion of said second member thereby promoting engagement between said cylindrical portion and said frustum portion, and promoting engagement between said arcuate portion and said long side portion whereby the bakery dough is configured after removal of said second member from the bakery dough to provide, after baking the bakery dough, a roll having a preselected configuration.

BRIEF DESCRIPTION OF THE DRAWINGS

The foregoing invention and its advantages may be readily appreciated from the following detailed description of the preferred embodiment, when read in conjunction with the accompanying drawings in which.

DESCRIPTION OF THE PREFERRED EMBODIMENT

Figure 3:
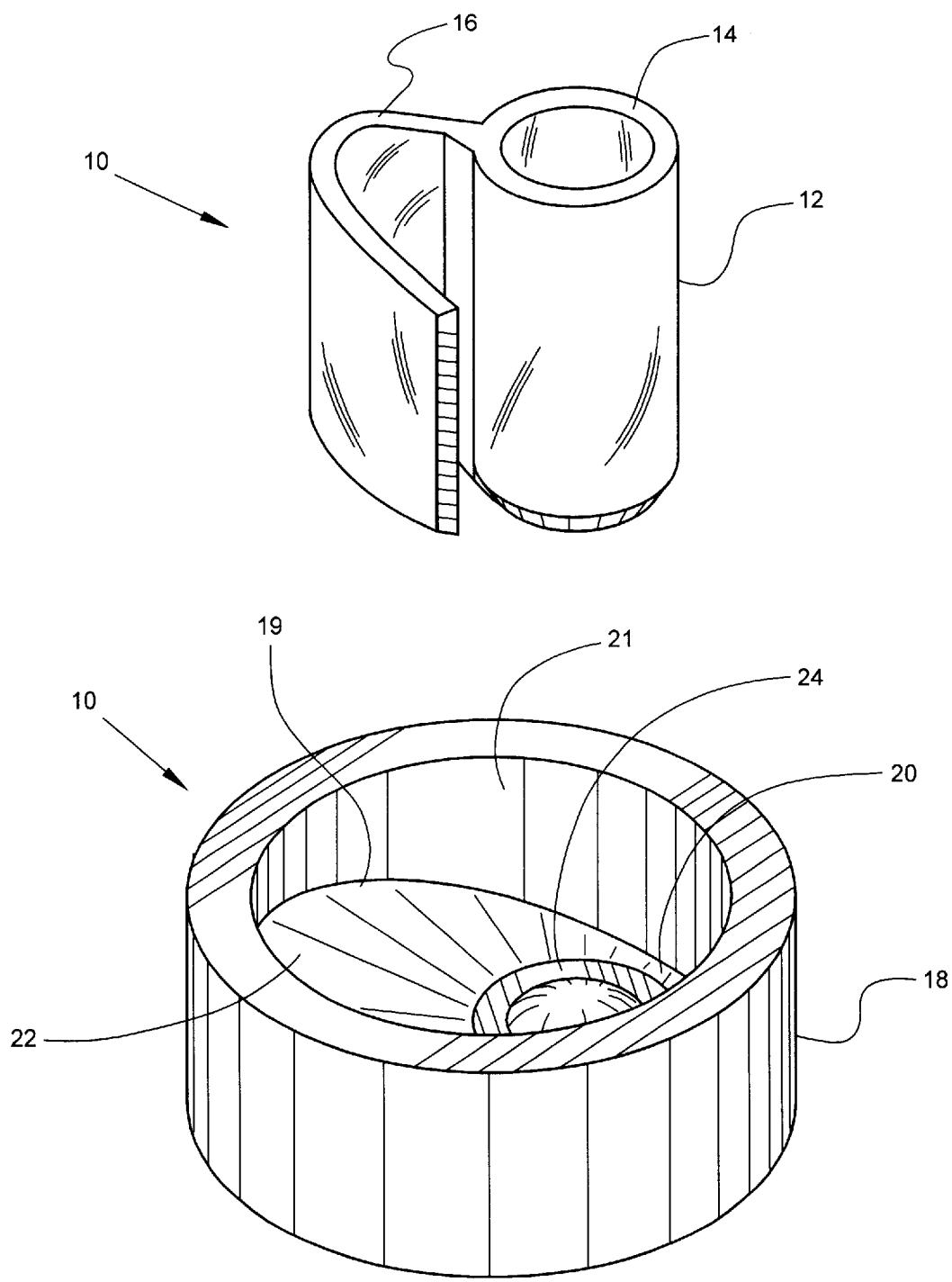
FIG. 3 is a top perspective view of a baking dough configuration device in accordance with the present invention.
Figure 4:
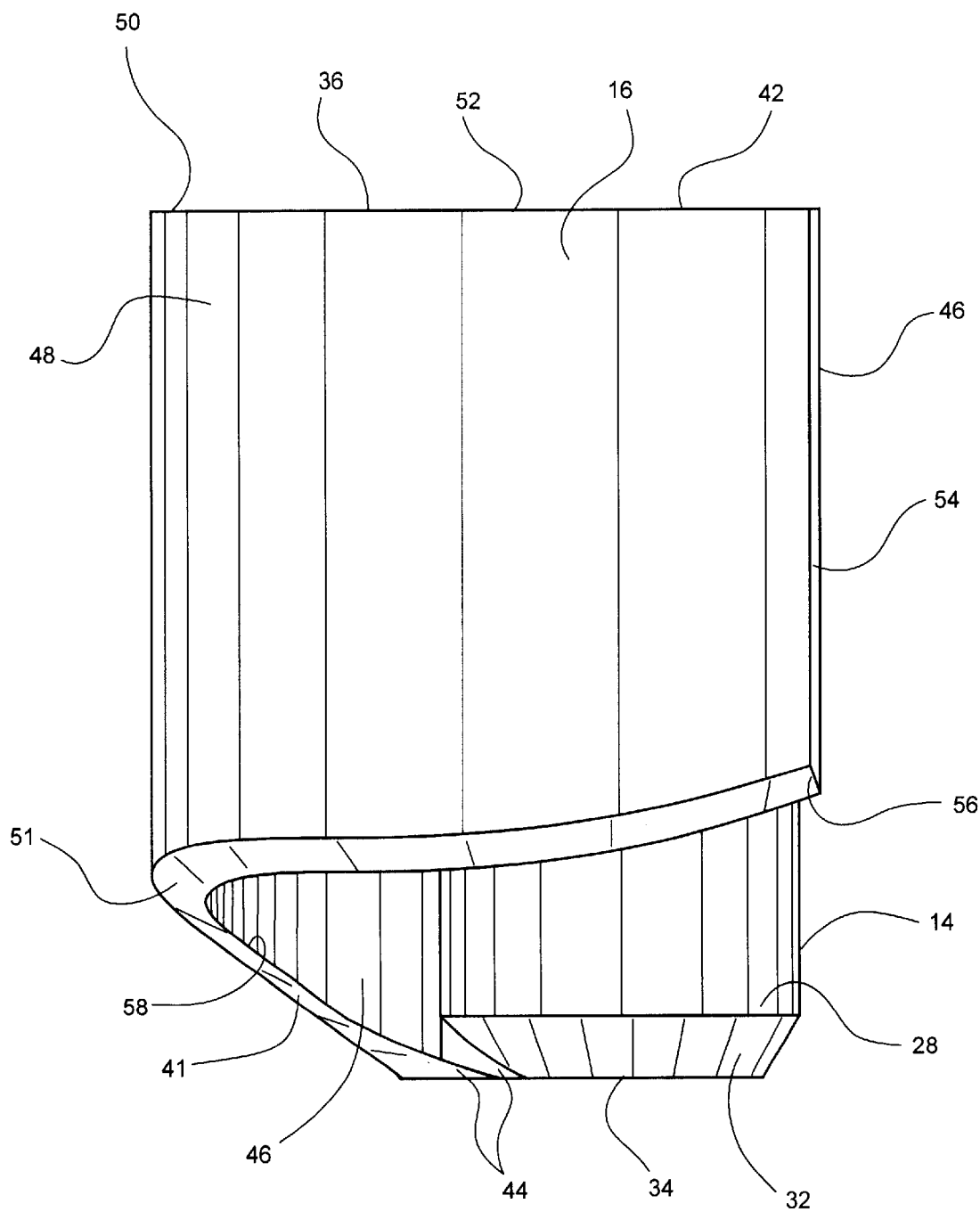
FIG. 4 is a front elevation view of a first member of the device of FIG. 3 in accordance with the present invention.
Figure 5:
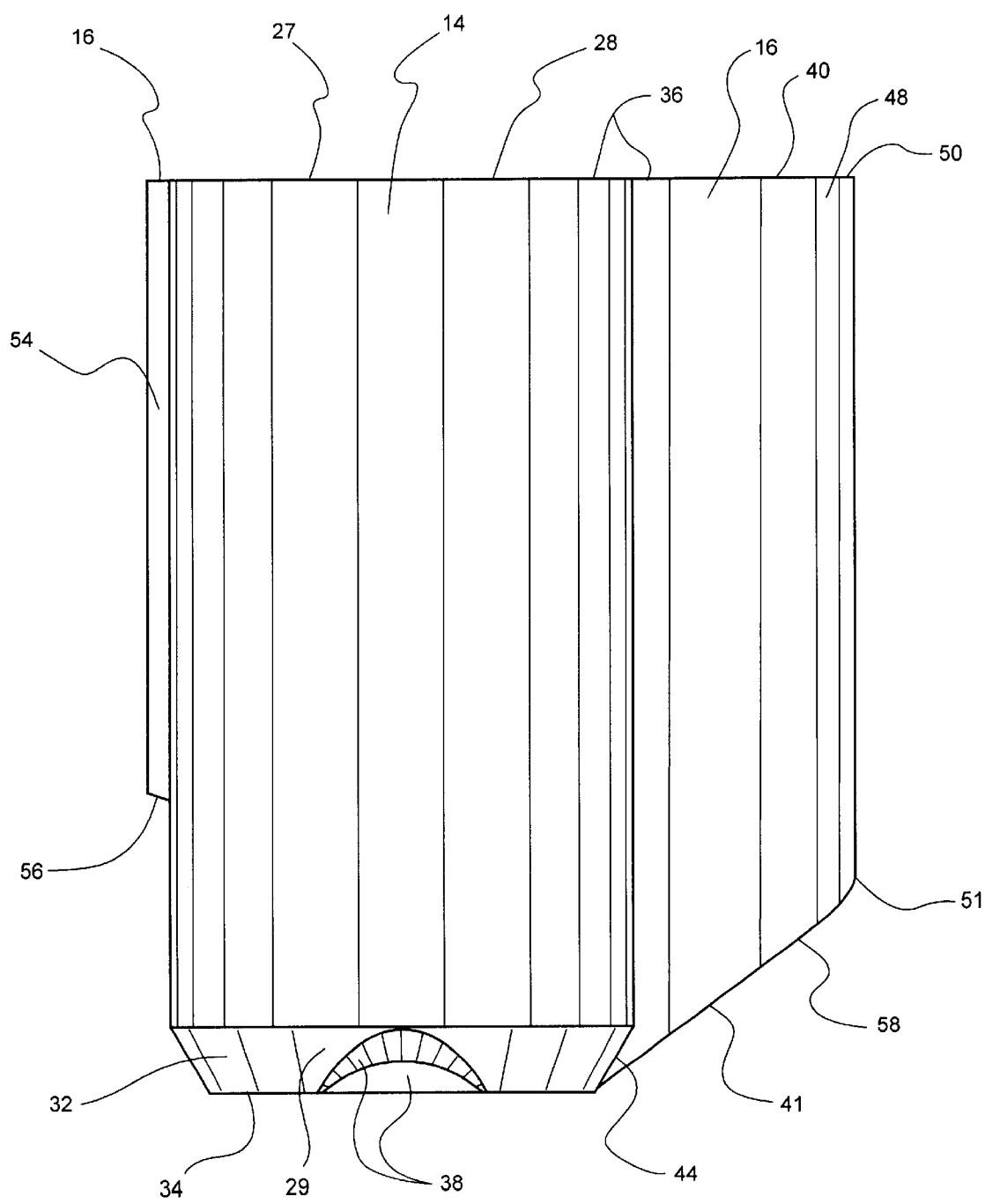
FIG. 5 is a back elevation view of the first member of FIG. 4.
Figure 6:
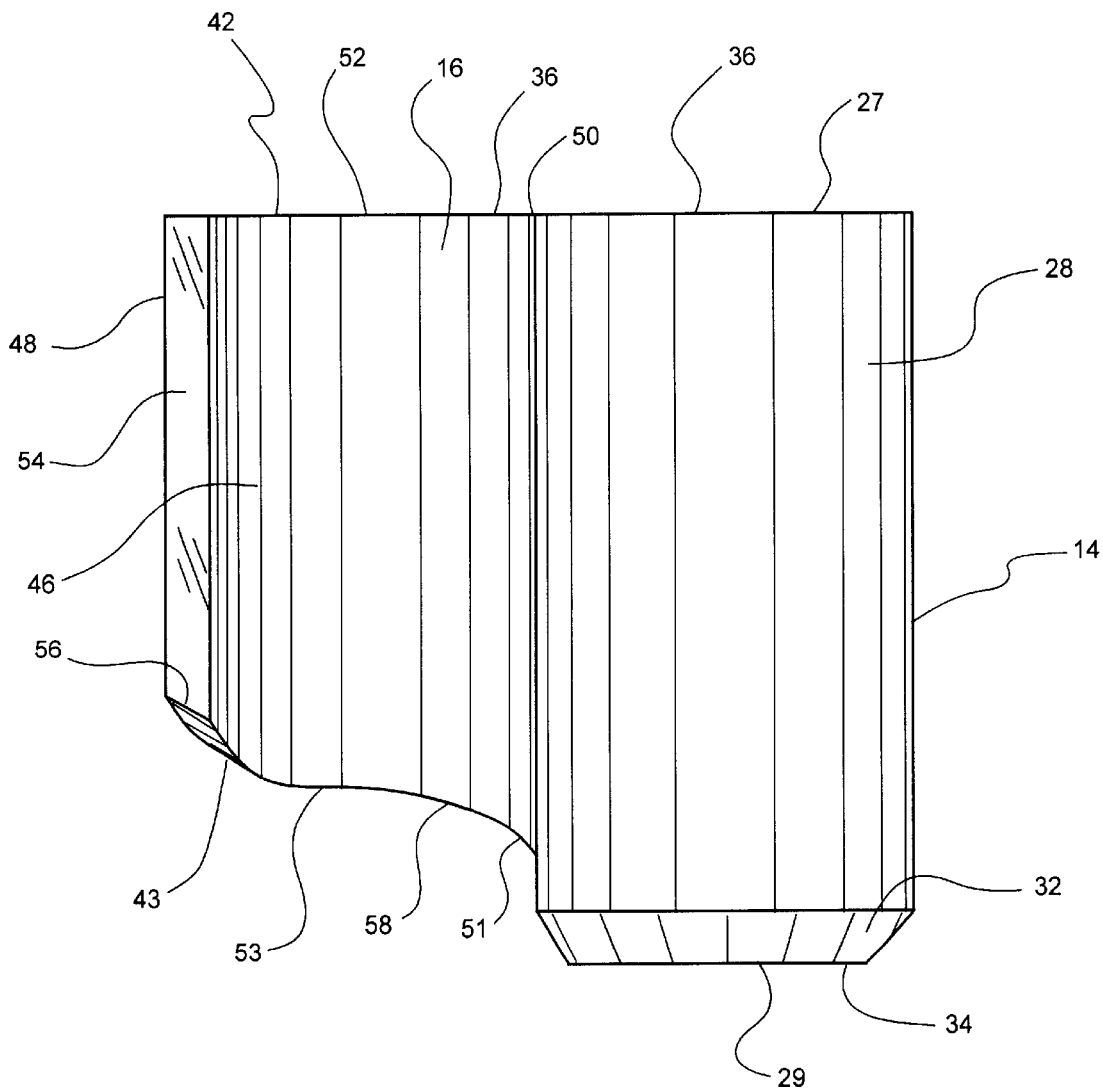
FIG. 6 is a right side elevation view of the first member of FIG. 4.
Figure 7:
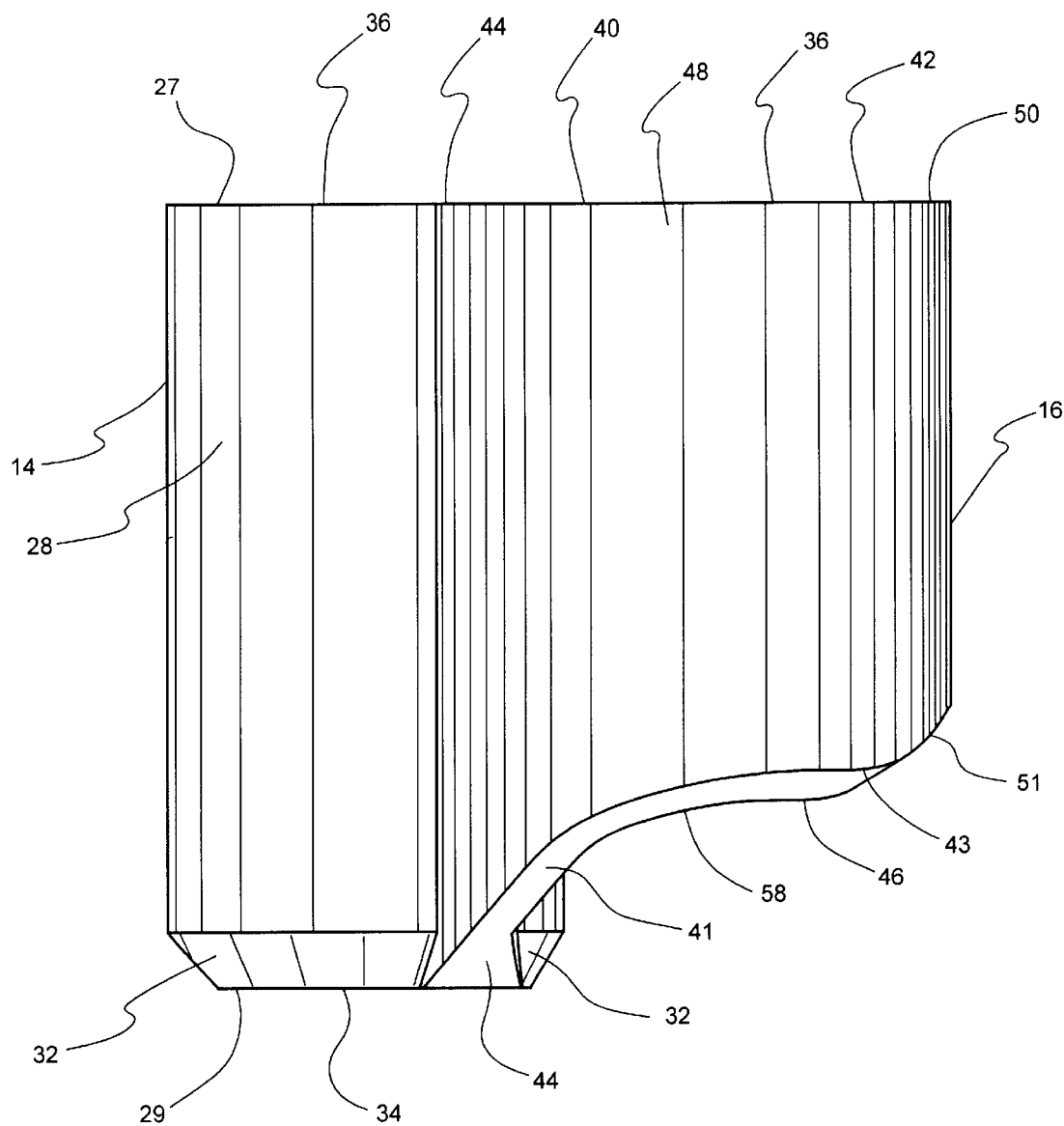
FIG. 7 is a left side elevation view of the first member of FIG. 4.
Figure 8:
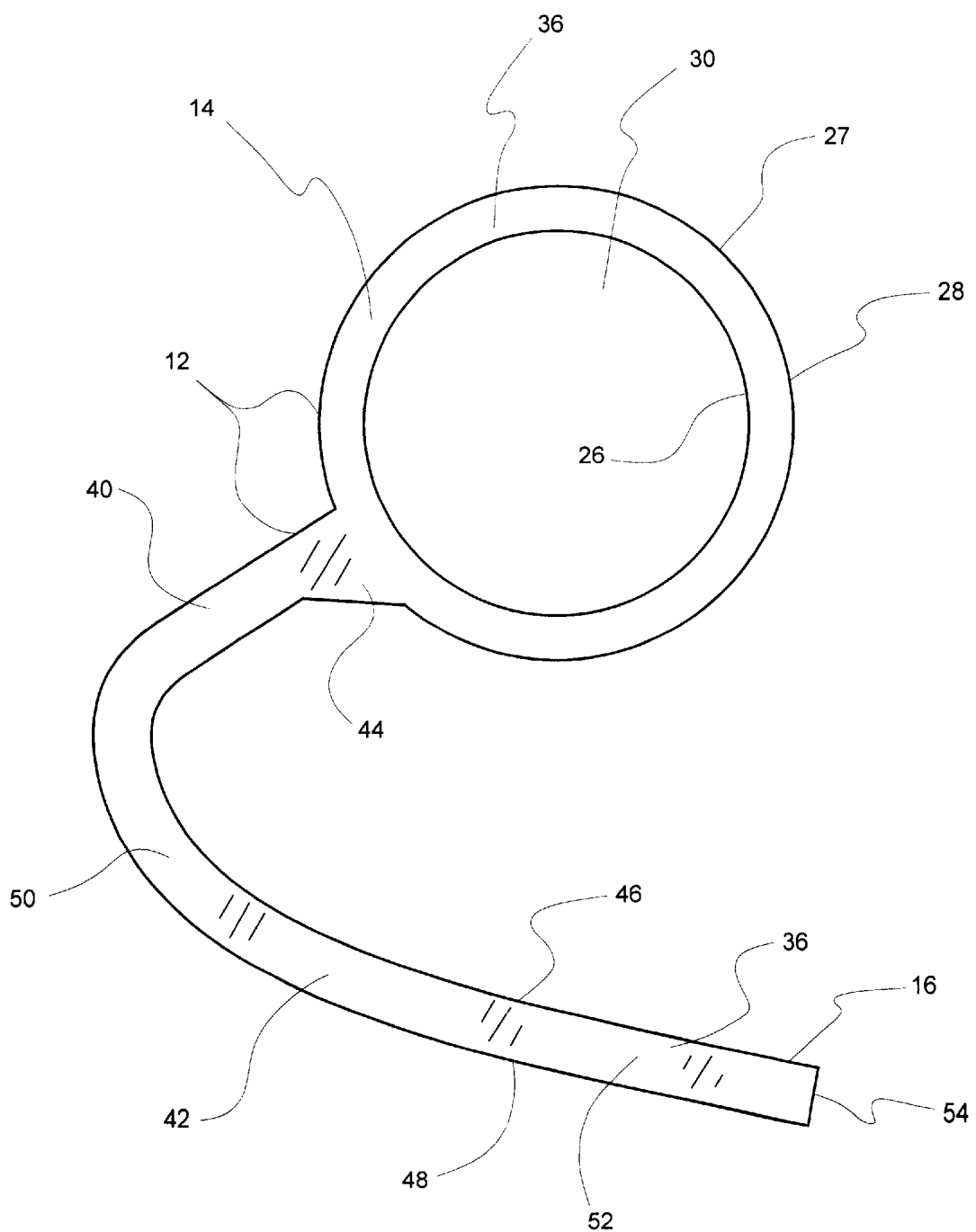
FIG. 8 is a top elevation view of the first member of FIG. 4.
Figure 9:
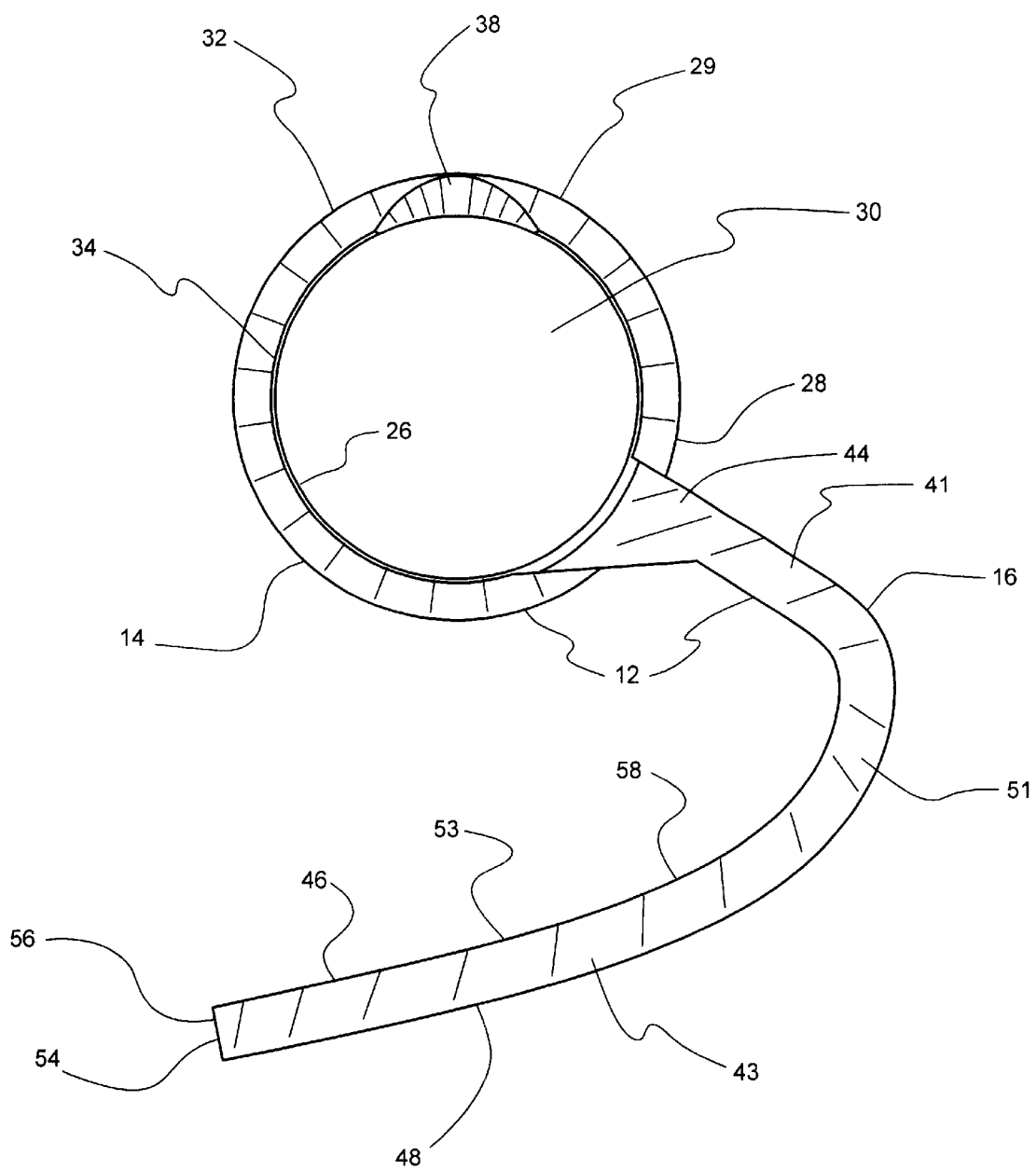
FIG. 9 is a bottom elevation view of the first member of FIG. 4.
Figure 10:
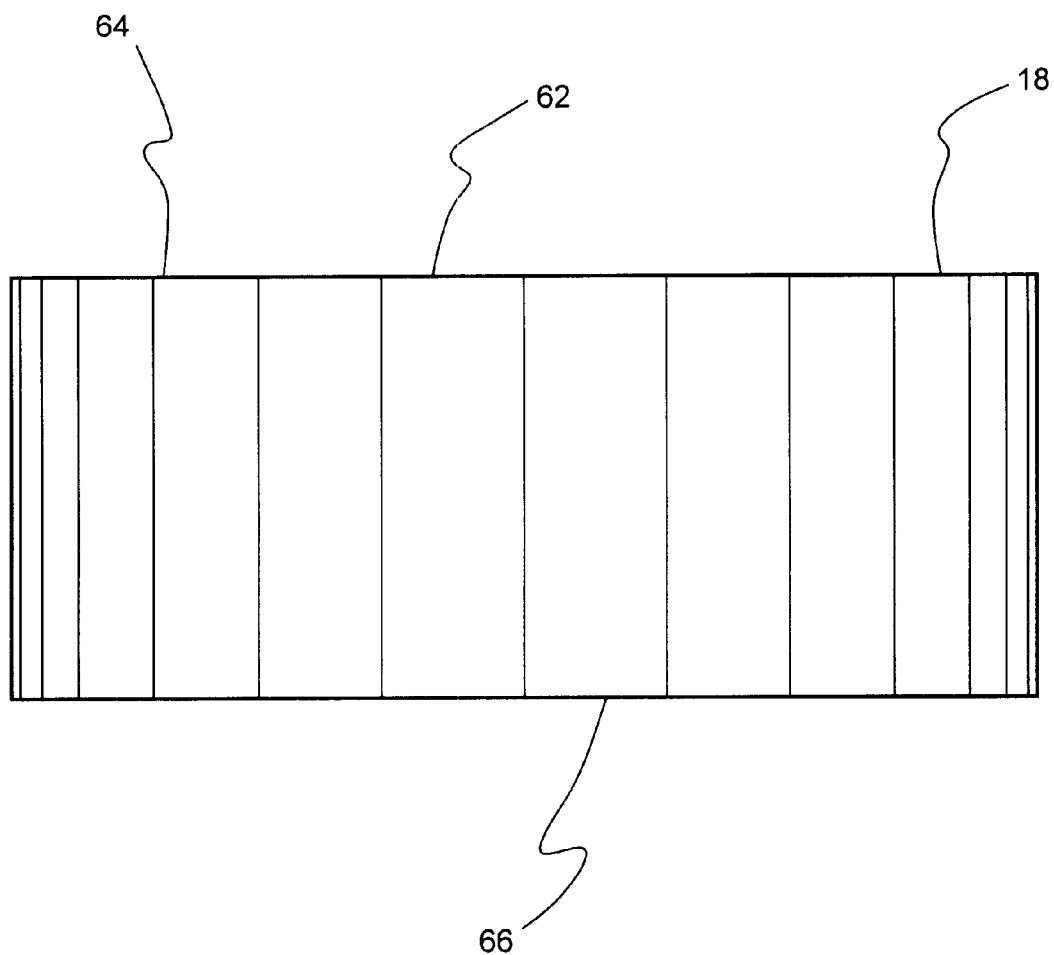
FIG. 10 is a front elevation view of a second member of the device of FIG. 3 in accordance with the present invention.
Figure 11:
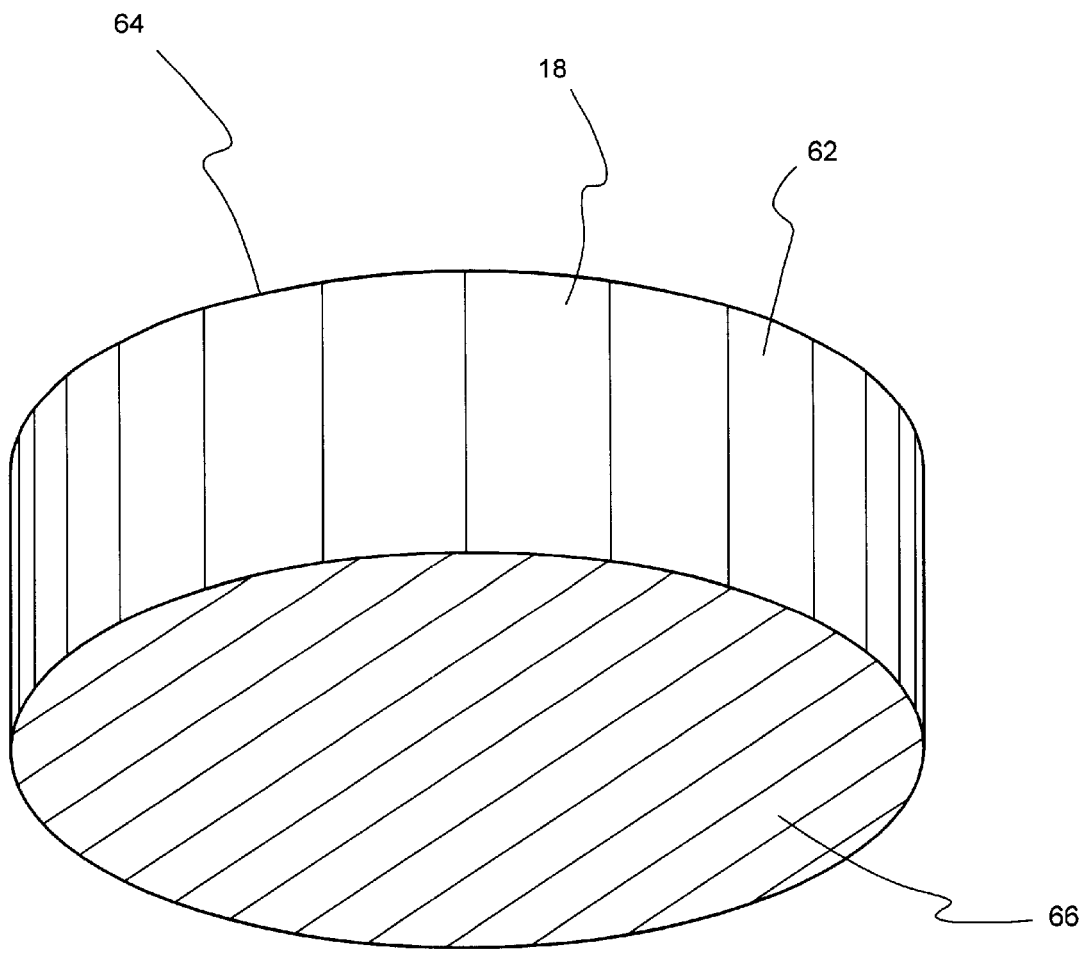
FIG. 11 is a bottom perspective view of the second member of FIG. 10.
Figure 12:
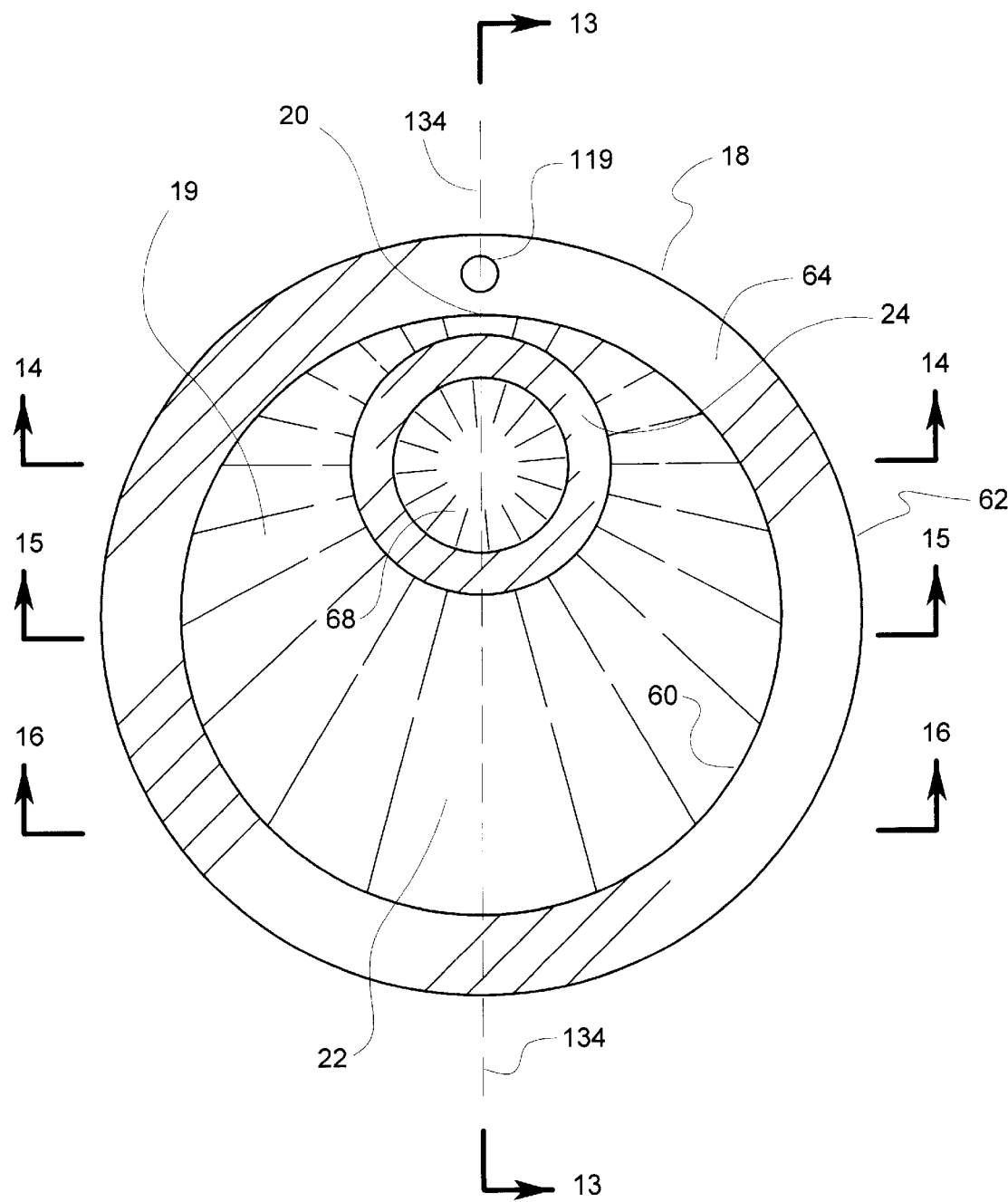
FIG. 12 is a top elevation view of the second member of FIG. 10.
Figure 13:
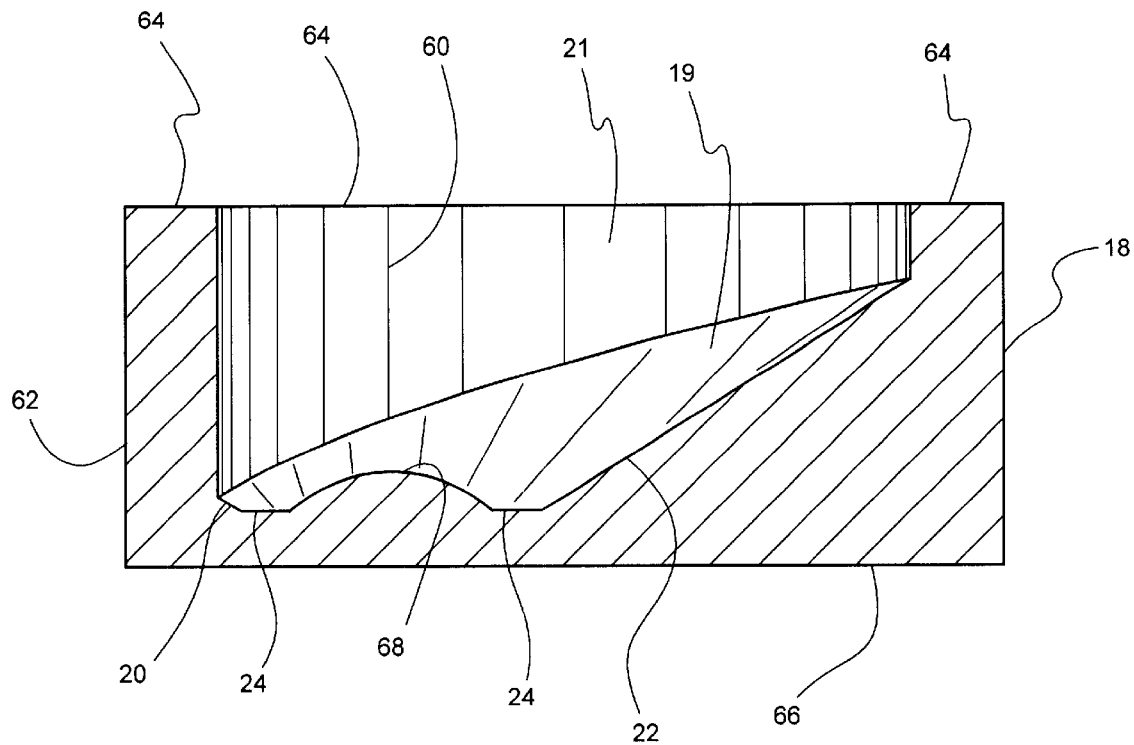
FIG. 13 is a sectional view taken along line 13—13 of FIG. 12.
Figure 14:
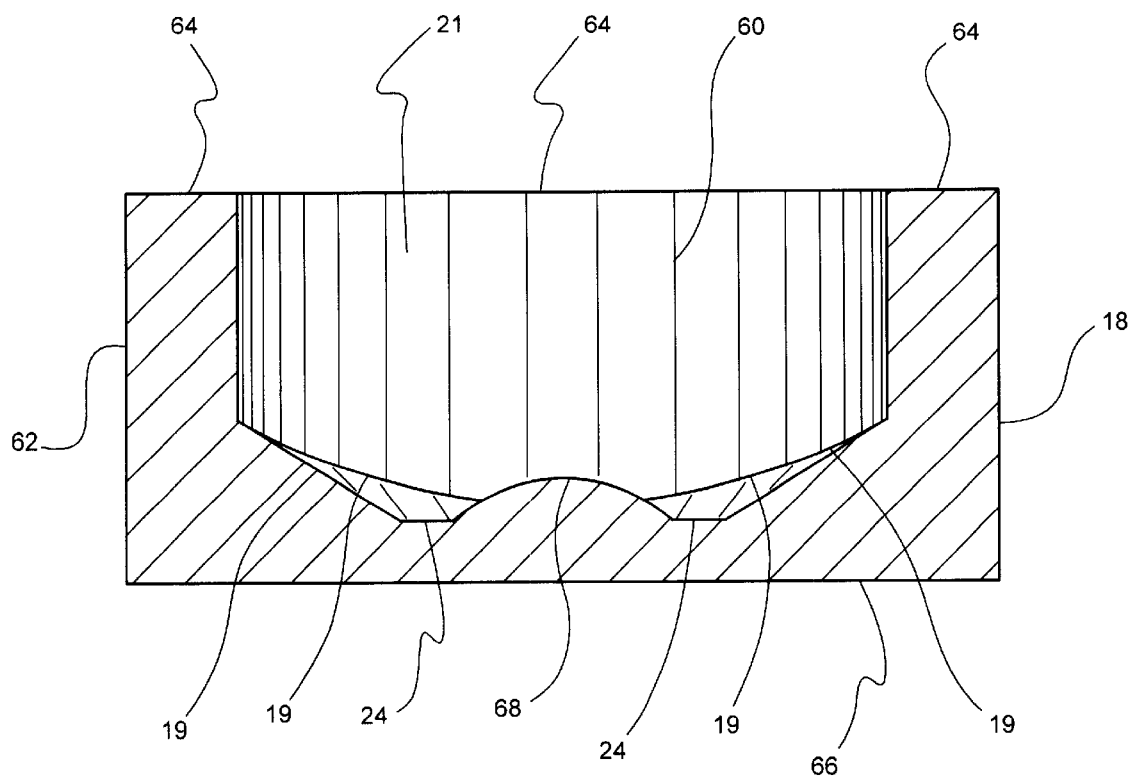
FIG. 14 is a sectional view taken along line 14—14 of FIG. 12.
Figure 15:
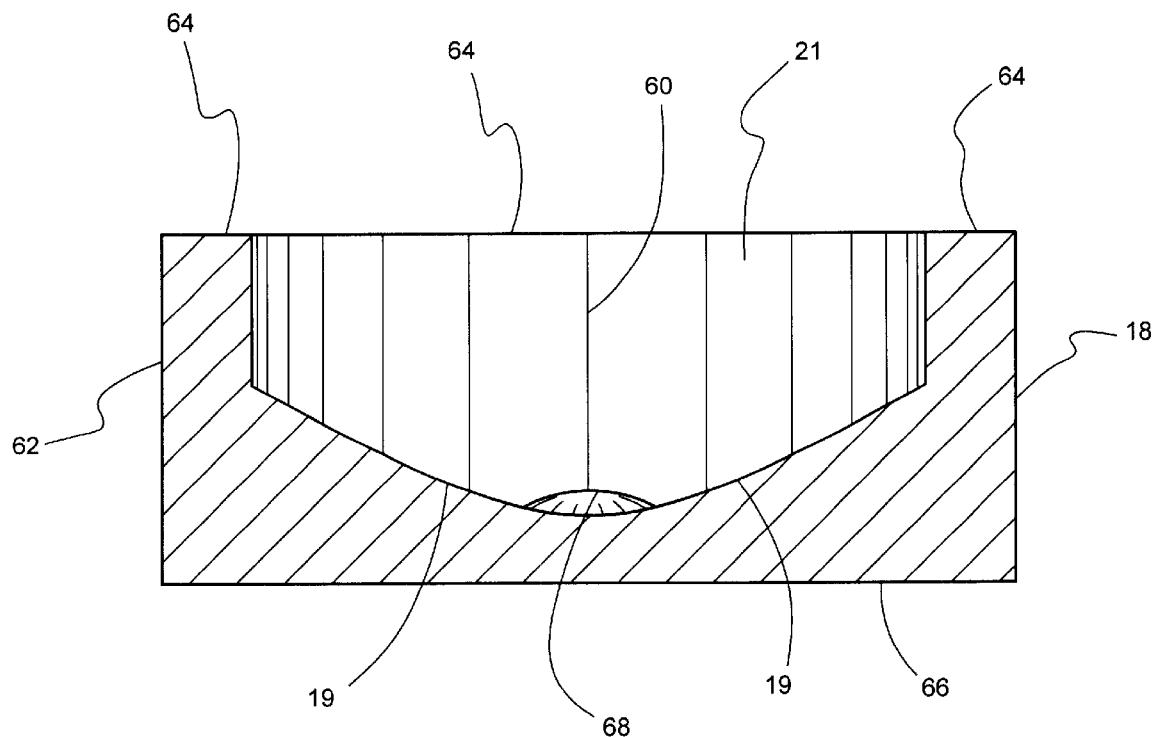
FIG. 15 is a sectional view taken along line 15—15 of FIG. 12.
Figure 16:
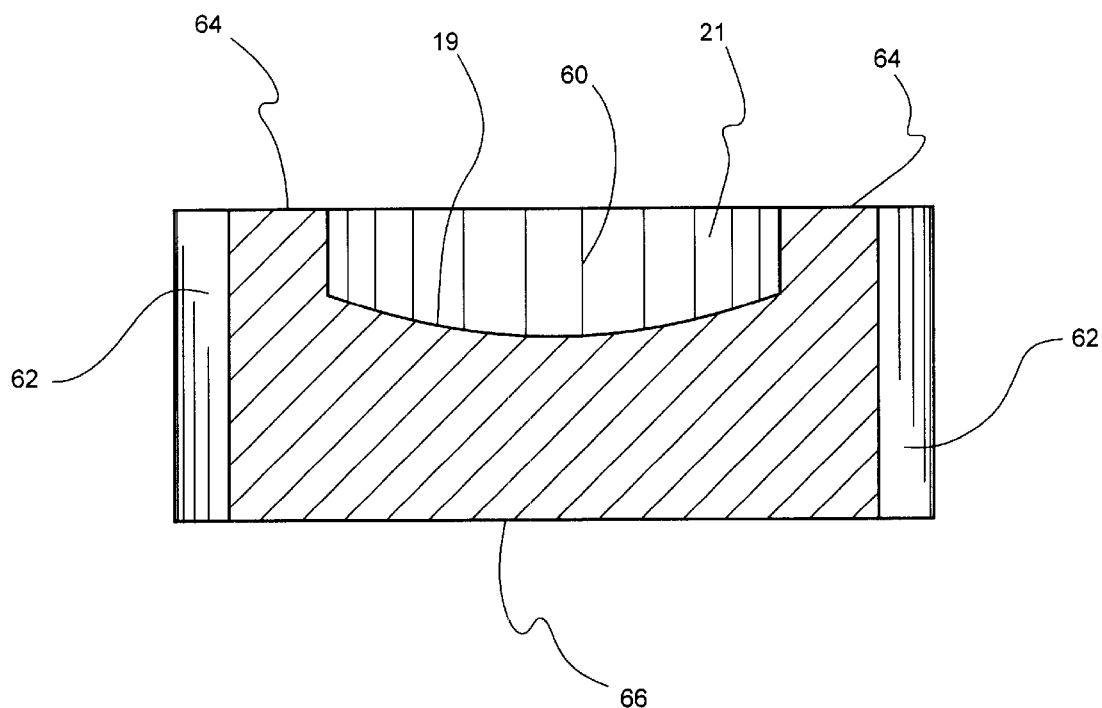
FIG. 16 is a sectional view taken along line 16—16 of FIG. 12.

Referring to the drawings, and in particular to FIG. 3, the reference numeral 10 designates generally a device for configuring baking dough. The device 10 includes a cutter or first member 12 configured from integrally joined cylindrical and arcuate portions 14 and 16; and a tray or second member 18 having an asymmetric, frusto-conically configured lower wall 19 that forms an inner cavity 21 that includes short and long side portions 20 and 22 with a frustum portion 24 there-between. The first and second members 12 and 18 may be fabricated from a myriad of materials including but not limited to Teflon, Delron, plastic, stainless steel, and aluminum with translucent plastic being the preferred material.

Referring now to FIGS. 4–9, the cylindrical portion 14 includes coaxial inner and outer cylindrical walls 26 and 28 that form a baking dough receiving cavity 30 with open first and second ends 27 and 29. The radial distance separating the inner and outer walls 26 and 28, is substantially about three-sixteenths of an inch; an optimal dimension for separating baking dough to avoid separated portions of the dough from rejoining or "healing" after being cut. The inner wall 26 defines a dough cutting end wall 32 dimensioned to separate baking dough into an annular configuration such that, after being baked, the dough results in a bread roll having an upper surface defining an annular center portion that corresponds to the separated baking dough. To more readily separate or cut the dough, the longitudinal dimension of the inner wall 26 is extended relatively longer than the longitudinal dimension of the outer wall 28 at the second end 29 to taper the dough cutting wall 32 relative to the baking dough thereby forming a relatively "sharp" dough cutting edge 34. The cutting edge 34 and the radial distance separating the inner and outer walls 26 and 28, cooperate to cut then divide the dough into distinct portions that remain separate and apart after the cylindrical portion 4 has been extracted from the dough.

Figure 1:
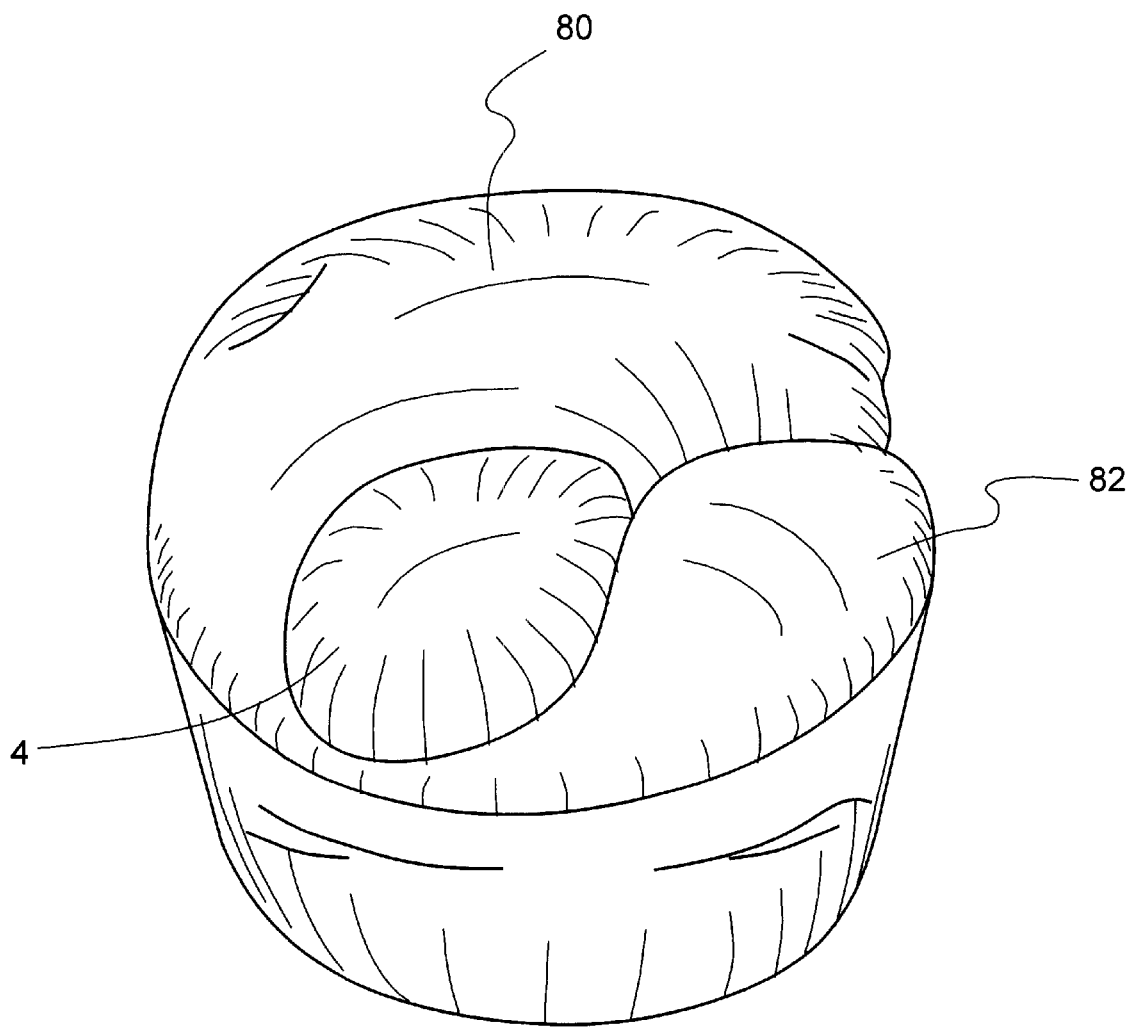
FIG. 1 is a perspective view of a bread roll derived from baking dough positioned in an overhand knot configuration in accordance with the prior art.

The first end 27 of the cylindrical portion 14 cooperates with a force receiving wall 36 to receive the linear force that ultimately separates or cuts the baking dough. The force receiving wall 36 is annularly configured and perpendicular to both the inner and outer cylindrical walls 26 and 28. The force receiving wall 36 has sufficient surface area to allow an individual to utilize his hands to forcibly urge the cylindrical portion 14 through the baking dough until the second end 29 of the cylindrical portion 14 engages the frustum portion 24 of the second member 18. Further, the open ends 27 and 29 of the receiving cavity 30 allow a cleaning tool to extend through the entire cylindrical portion 14 from either end. Alternatively, the force receiving wall 36 may be configured to enclose the first end 27 of the cavity 30 to provide more surface area of engagement between the force receiving wall 36 and a person's hand to reduce the possibility of injury to the hand when the cutting force is applied to the cylindrical portion 14; however, access for cleaning the dough receiving cavity 30 in the cylindrical portion 14, would only be possible via the second end 29. The second end 29 of the cylindrical 14 further includes a relatively small recess or notch 38. The notch 38 prevents the complete separation of the cylindrically cut portion of dough, when cut by the cylindrical portion 14, from the remainder of the dough, thus forming a "hinge" or connecting piece that restricts the expansion of the "hinged" side of the cylindrical portion of dough during the conditioning stage (when dough is placed in an environmental chamber to allow growth of the yeast) of the dough. The restricted expansion of the dough during the conditioning stage, causes the dough to "curl" thereby forming a dough configuration that substantially resembles the center portion 2 of the overhead knot configuration depicted in FIG. 2 which develops into the center portion 4 of the baked roll of FIG. 1.

The arcuate portion 16 of the first member 12 includes upper and lower short sections 40 and 41, and upper and lower long sections 42 and 43, when taking corresponding top or bottom elevation views of the device 10. The arcuate portion 16 further includes an enlarged base portion 44 that cooperates with the short sections 40 and 41 to integrally join the arcuate portion 16 to the cylindrical portion 14. The arcuate portion 16 has inner and outer parallel walls 46 and 48 that are spaced apart substantially about three-sixteenths of an inch with both walls 46 and 48 being longitudinally parallel to the longitudinal axis of the cylindrical portion 14. The inner and outer walls 46 and 48 are configured, when taking a side elevation view of the device 10, to extend from the first end 27 of the cylindrical portion 14 to a predetermined longitudinal distance generally shorter than the axial length of the cylindrical portion 14 resulting with the upper short section 40 and the base portion 44 being joined planar to the first end 27 of the cylindrical portion 14, and the lower short section 41 and the base portion 44 being angularly joined to the second end 29 of the cylindrical portion 14. The lower short section 41 extends from the FS second end 29 of the cylindrical portion 14 a distance of substantially about three-quarters of an inch toward the first end 27. The lower short section 41 forms an acute angle with the plane of the cutting edge 34 of the cylindrical portion 14, the angle measuring substantially about twenty-five degrees ( see FIG. 5 ). The distance and angle defined by the lower short section 41 will correspondingly vary with the size and configuration of the preselected roll.

The upper and lower long sections 42 and 43 of the arcuate portion 16 include upper and lower arcuate sections 50 and 51 integrally joined to respective short sections 40 and 41; and relatively linear upper and lower "straight" sections 52 and 53 (substantially about one inch in length) that ultimately define the end wall 54 of the arcuate portion 16. The arcuate upper and lower sections 50 and 51 form an acute angle between the upper and lower short sections 40 and 41, and the corresponding upper and lower straight sections 52 and 53 (see FIGS. 8 and 9). The upper and lower straight sections 52 and 53 are orientated substantially tangential to the outer cylindrical wall 28 of the cylindrical portion 14, and are spatially separated from the outer cylindrical wall 28 substantially about one inch. The combined lower arcuate section 51 and lower straight section 53 provide an incline between a lower edge 56 of the end wall 54 and the lower short side 41 of substantially about ten degrees. Further, the inner wall 46 of the arcuate portion 16 extends longitudinally a distance relatively longer than the longitudinal dimension of the outer wall 48 thereby providing a cutting edge 58 for the arcuate portion 16. The cutting edge 58 and the distance separating the inner and outer walls 46 and 48 of the arcuate portion 16, cooperate to cut then divide the dough into distinct portions that remain separate and apart after the arcuate portion 16 has been extracted from the dough.

Referring to FIGS. 4–7, the lower straight section 53 of the arcuate portion 16 includes a relatively slight "upward" curvature from the lower arcuate section 51 to the end wall 54. The curvature is required due to the diverging or spiraling arcuate portion 16 relative to the cylindrical portion 14 (see FIGS. 8 and 9). More specifically, the cutting edge 58 of the lower straight section 53 engages the conically configured lower wall 19 of the second member 18. Also, the cutting edge 58 is spiraling distally relative to the cylindrical portion 14. Therefore, the cutting edge 58 must have an incline corresponding to the slope of the conical lower wall 19 as the cutting edge 58 diverges from the cylindrical portion 14 so that congruent engagement between the cutting edge 58 and the lower wall 19 may be maintained.

Figure 2:
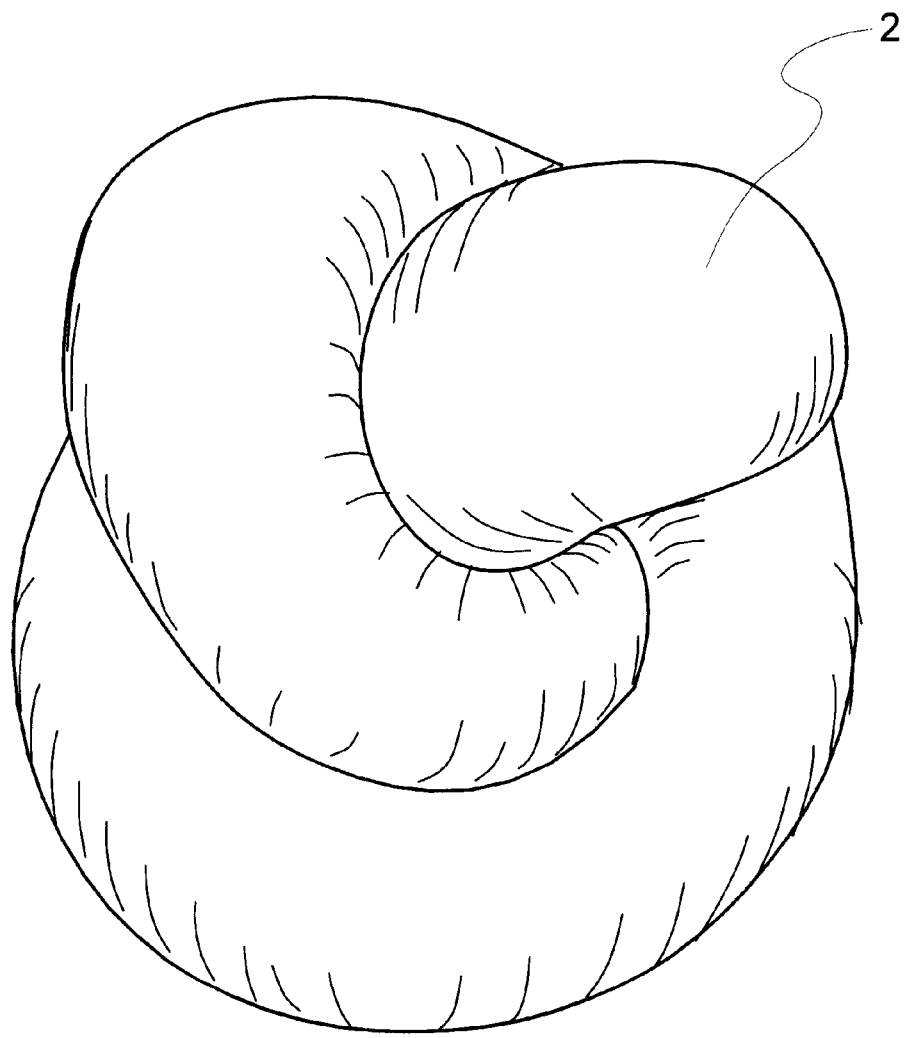
FIG. 2 is a perspective view of baking dough positioned in an overhand knot configuration in accordance with the prior art.
Figure 18:
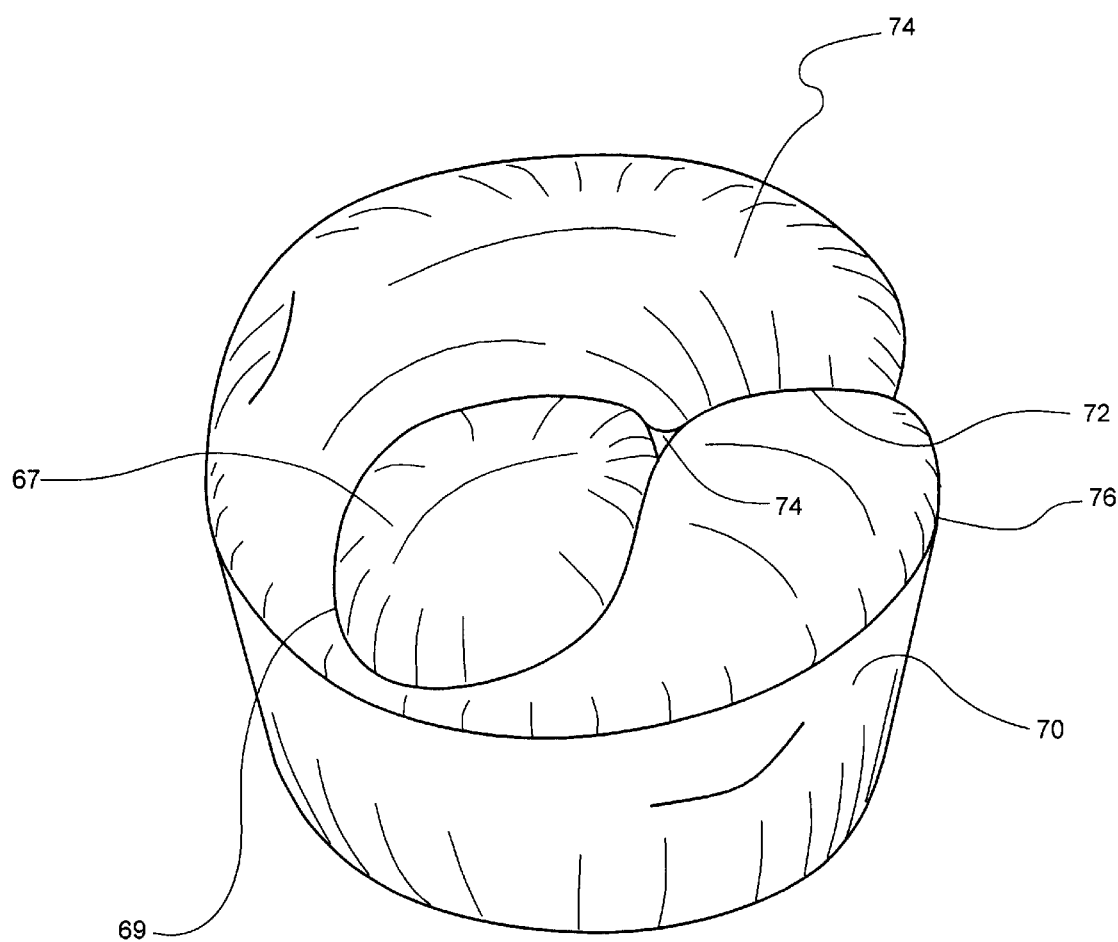
FIG. 18 is a perspective view of a bread roll derived from baking dough configured in accordance with the present invention.
Figure 19:
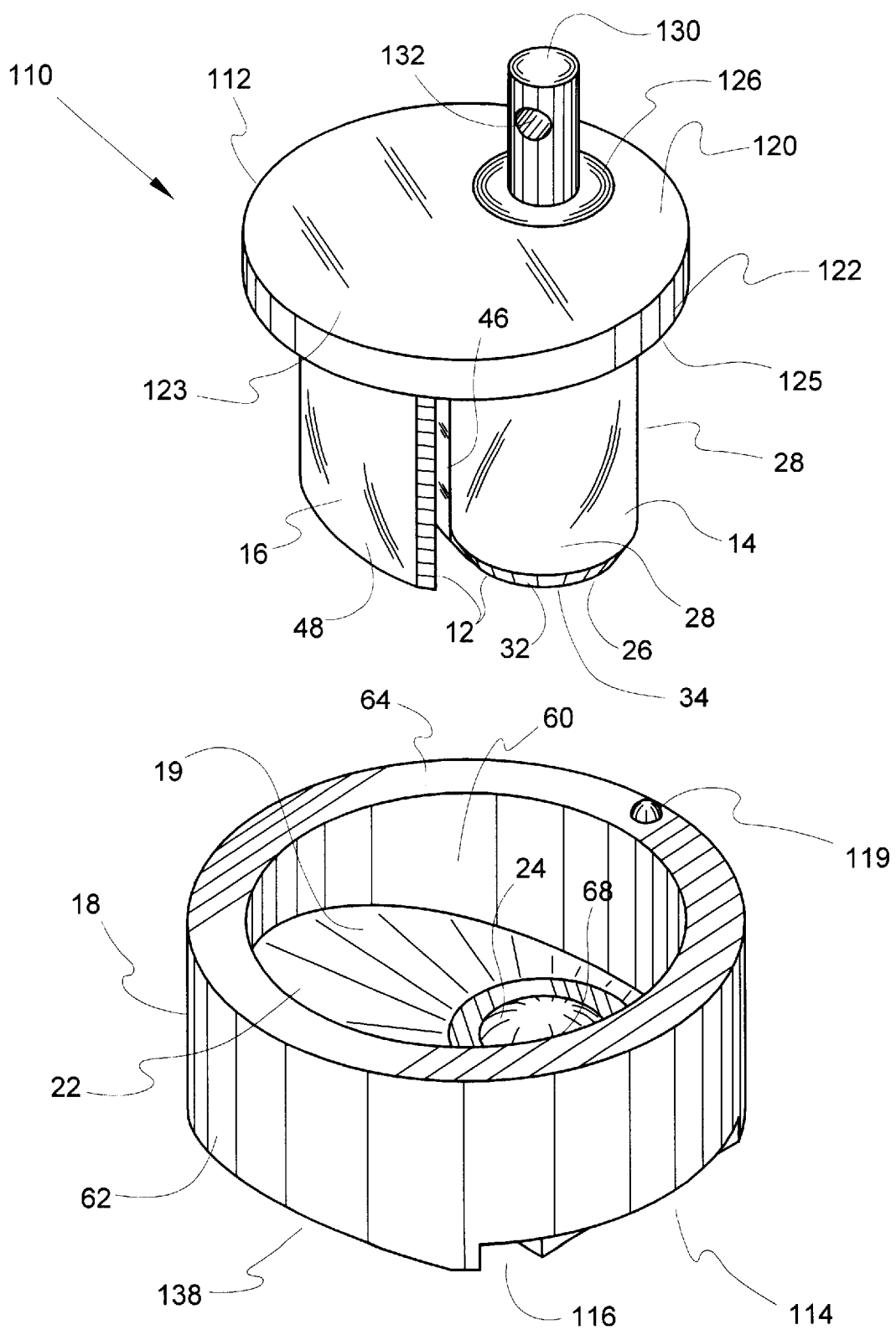
FIG. 19 is a top perspective view of an alternative embodiment of baking dough configuration device in accordance with the present invention.
Figure 20:
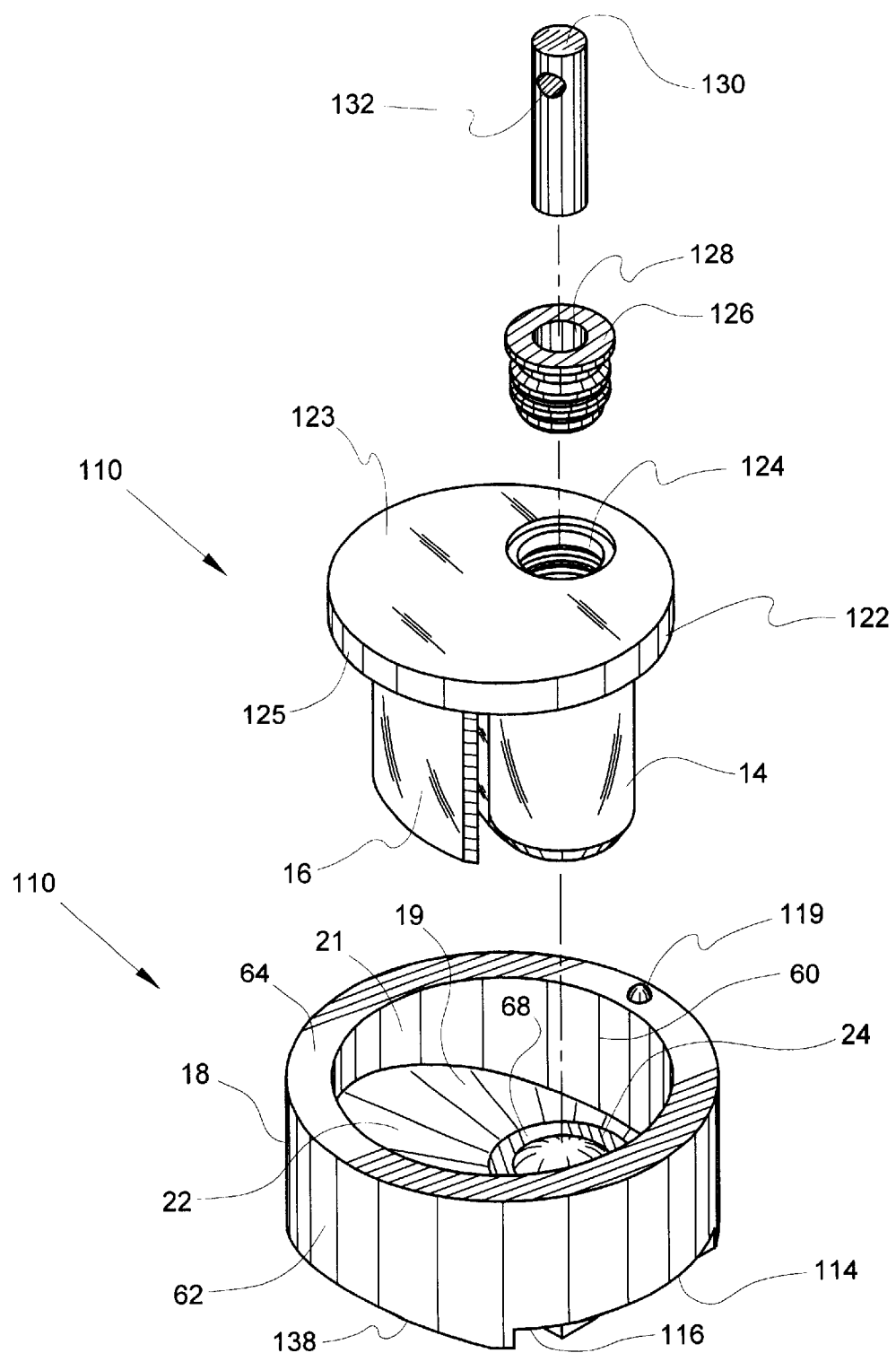
FIG. 20 is a top exploded perspective view of the device of FIG. 19.
Figure 21:
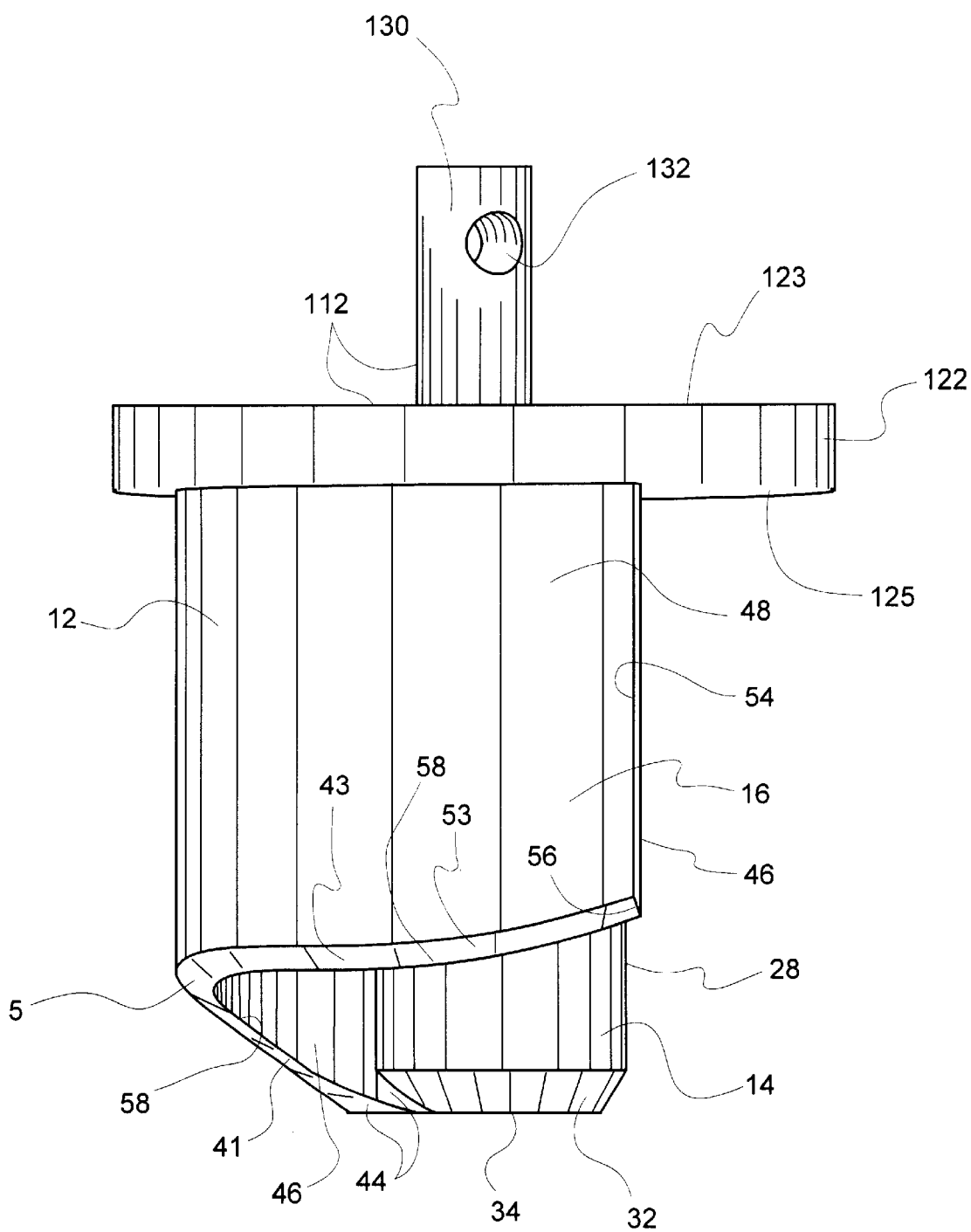
FIG. 21 is a front elevation view of a first member of the device of FIG. 19 in accordance with the present invention.
Figure 22:
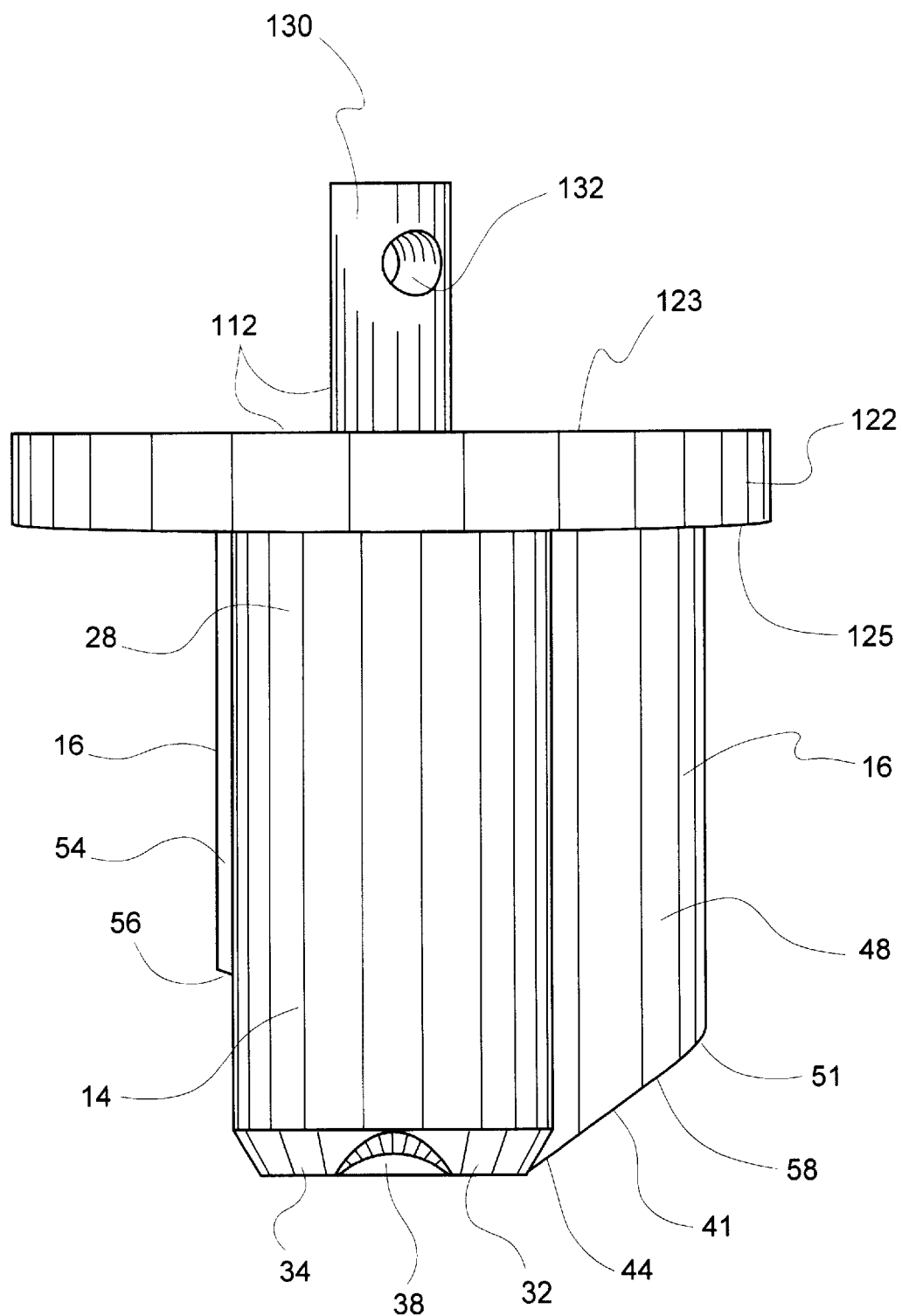
FIG. 22 is a back elevation view of the first member of FIG. 21.
Figure 23:
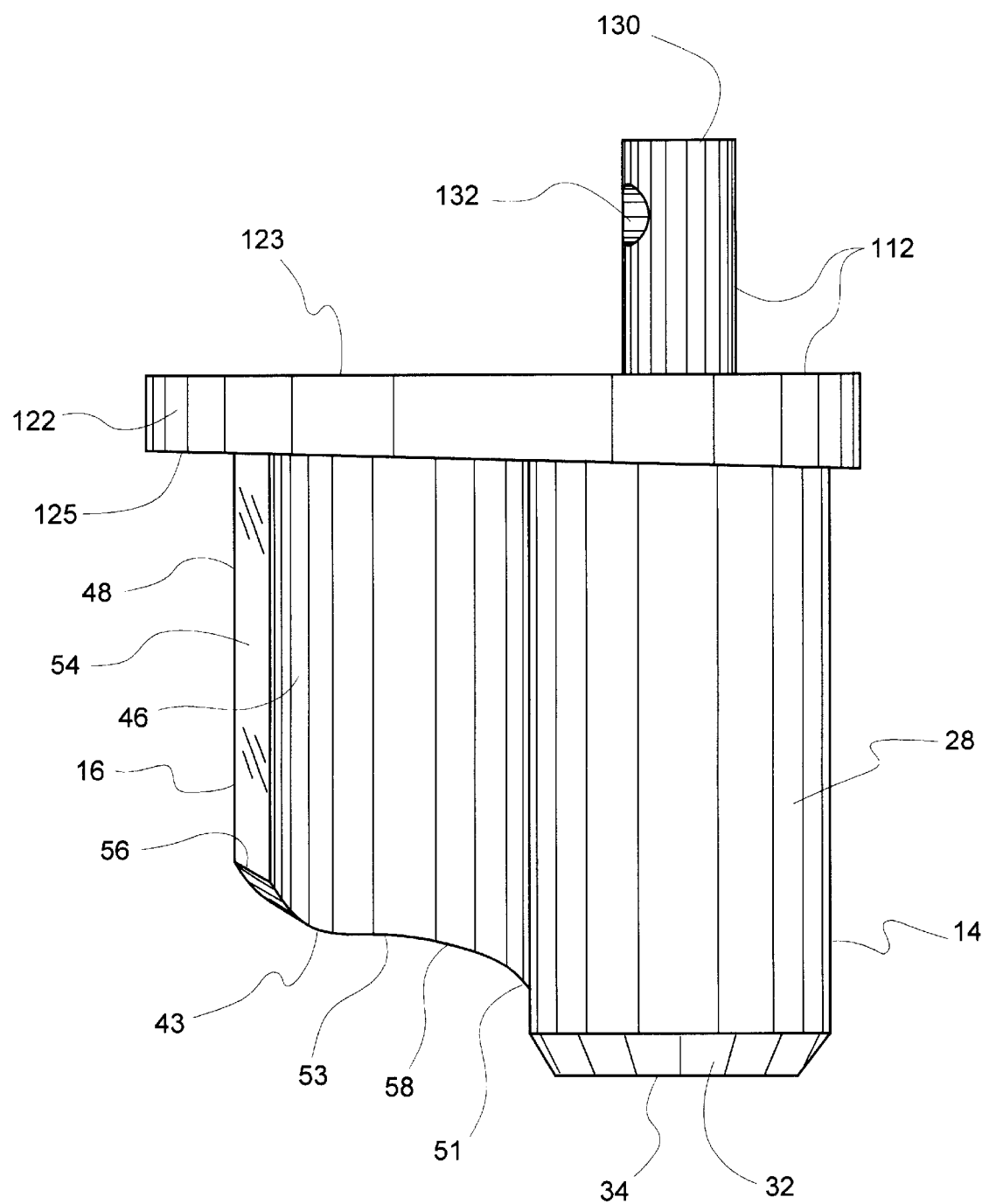
FIG. 23 is a right side elevation view of the first member of FIG. 21.
Figure 24:
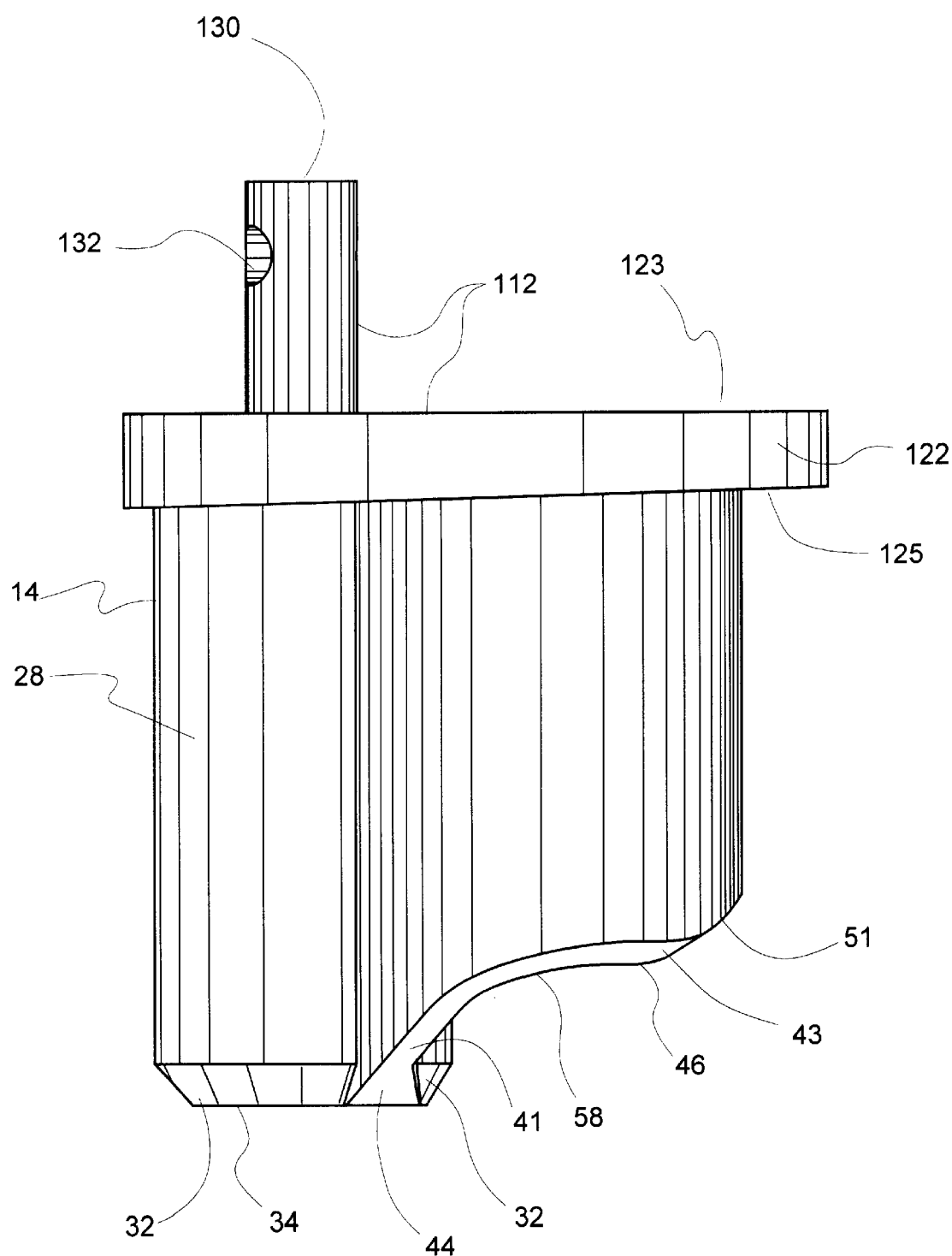
FIG. 24 is a left side elevation view of the first member of FIG. 21.
Figure 25:
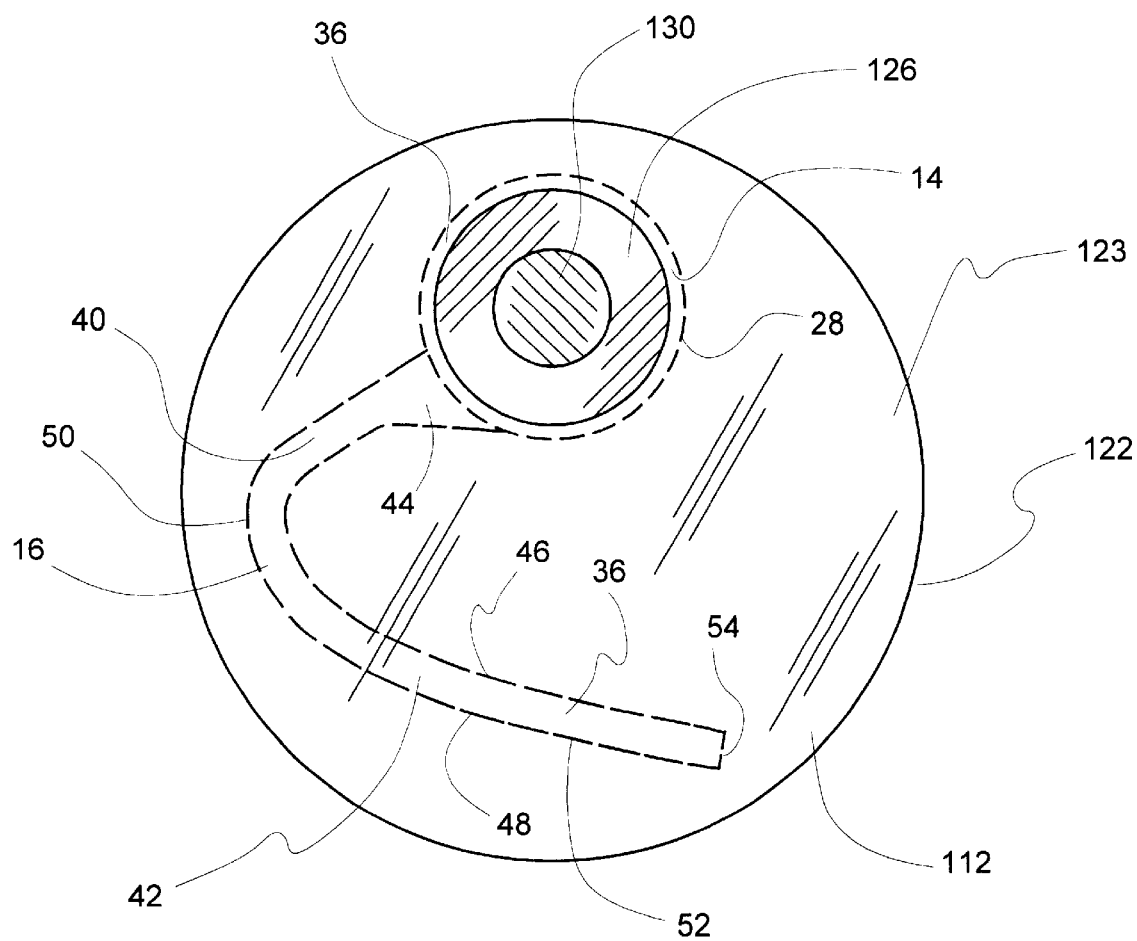
FIG. 25 is a top elevation view of the first member of FIG. 21.
Figure 26:
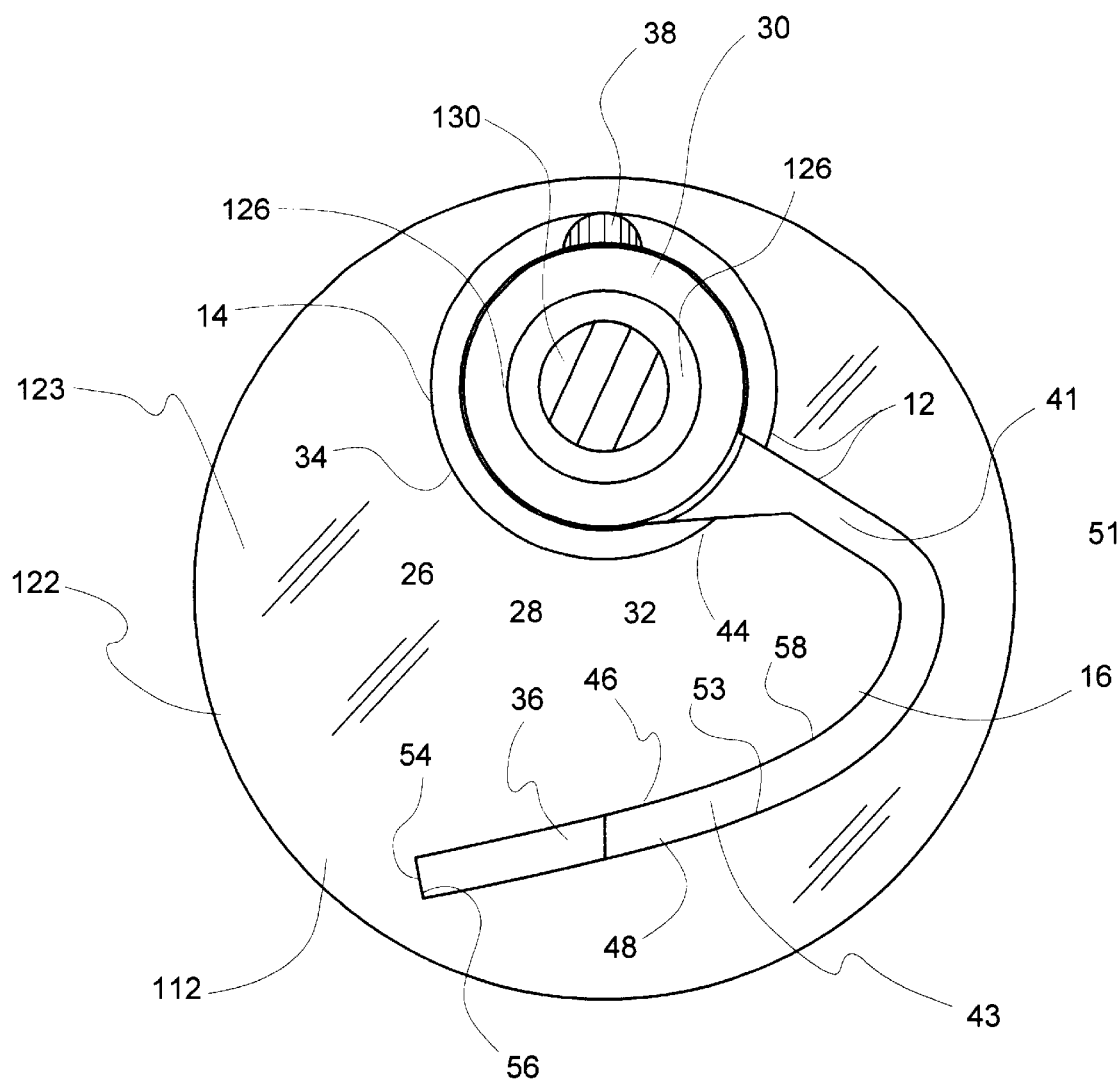
FIG. 26 is a bottom elevation view of the first member of FIG. 21.
Figure 27:
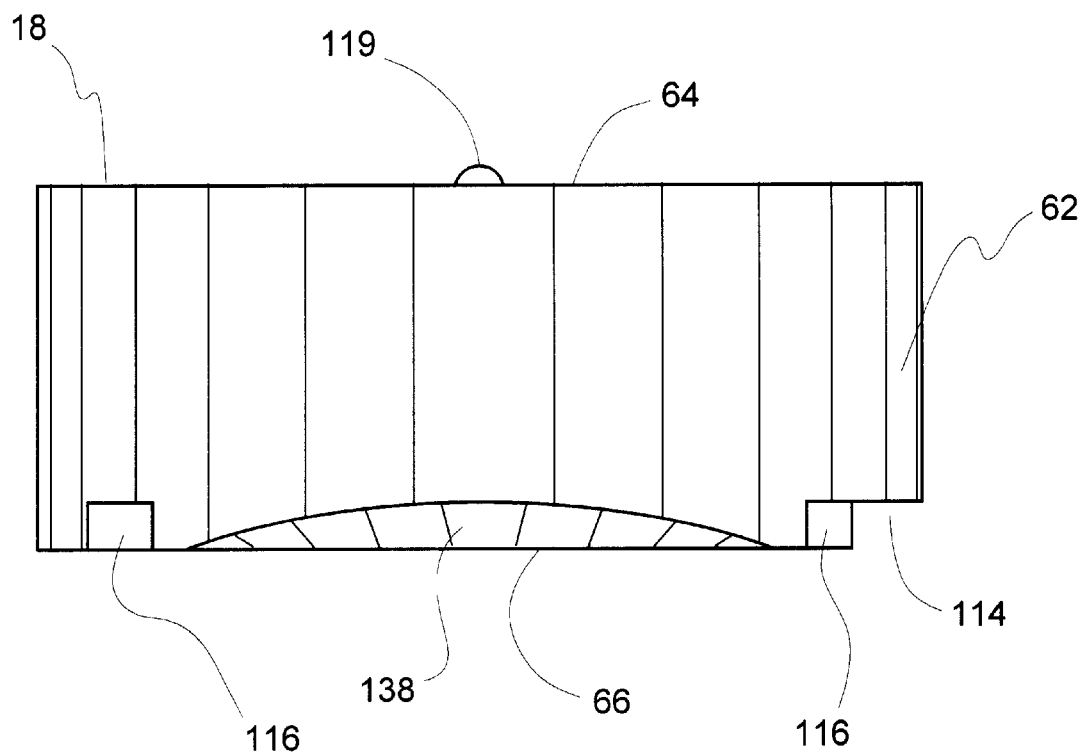
FIG. 27 is a front elevation view of a second member of the device of FIG. 19.
Figure 28:
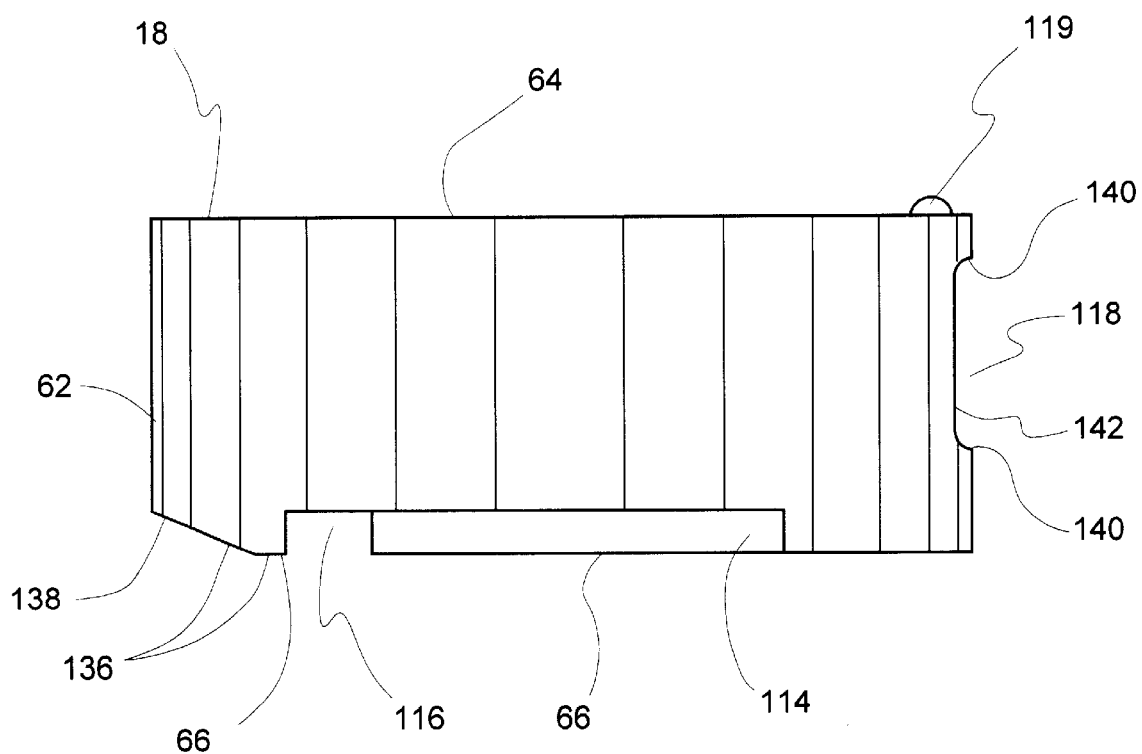
FIG. 28 is a right side elevation view of the second member of FIG. 27.
Figure 29:
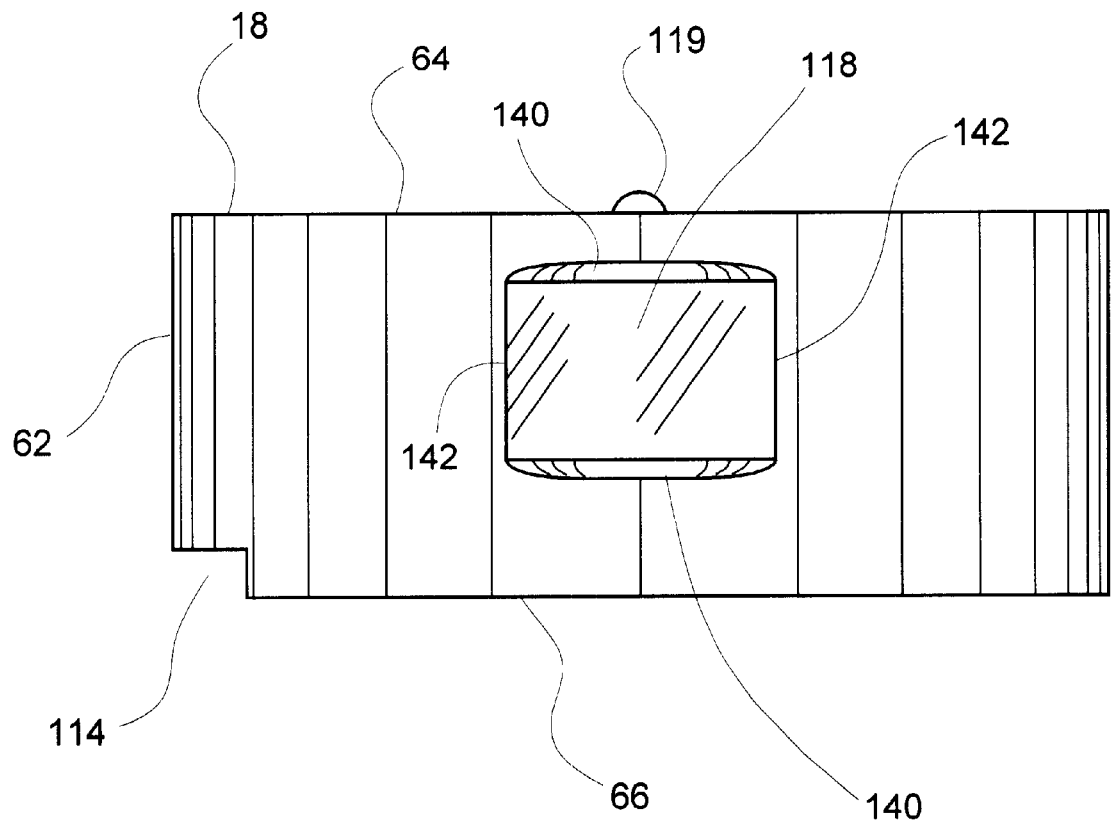
FIG. 29 is a back elevation view of the second member of FIG. 27.
Figure 30:
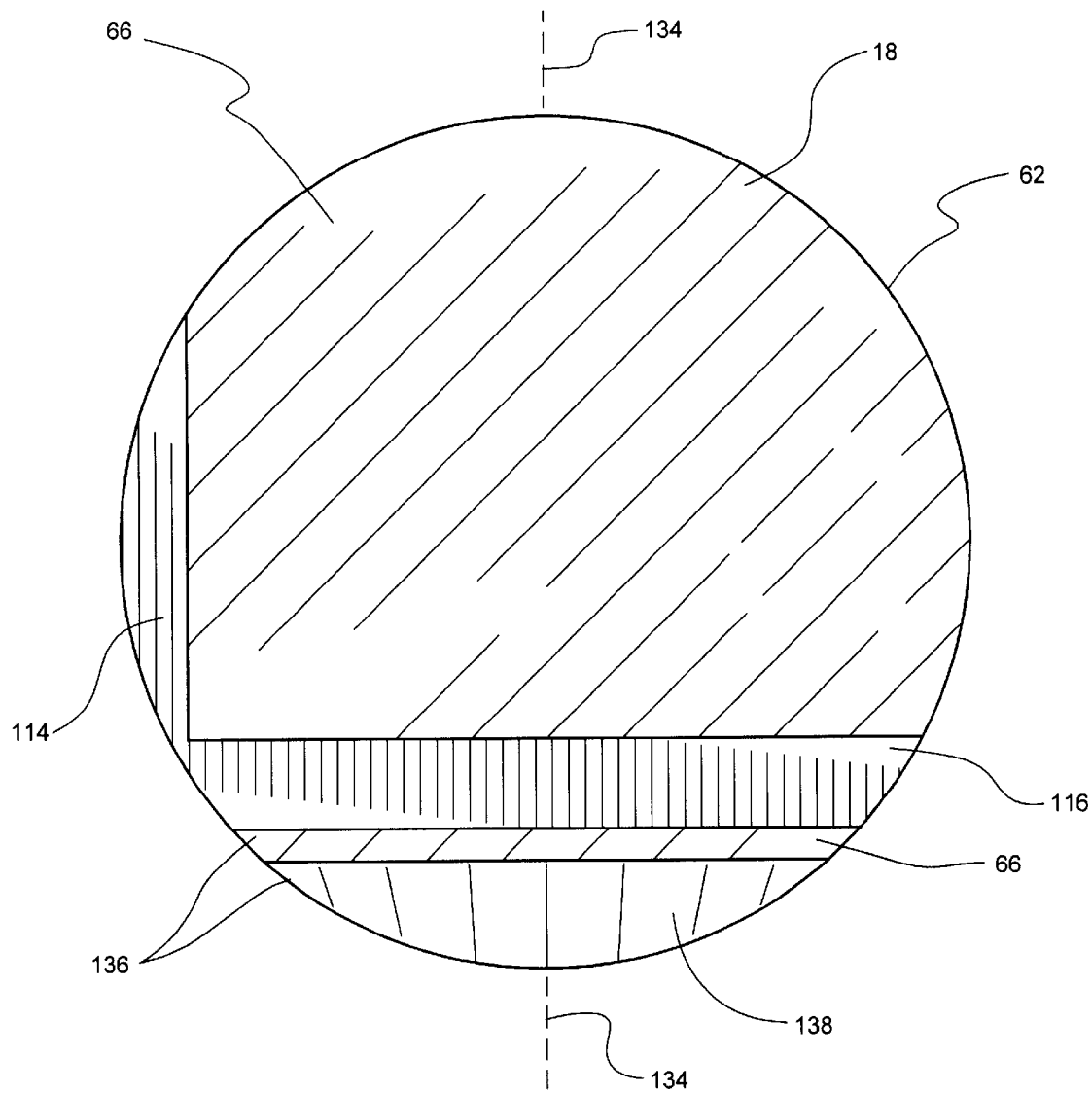
FIG. 30 is a bottom elevation view of the second member of FIG. 27.
Figure 31:
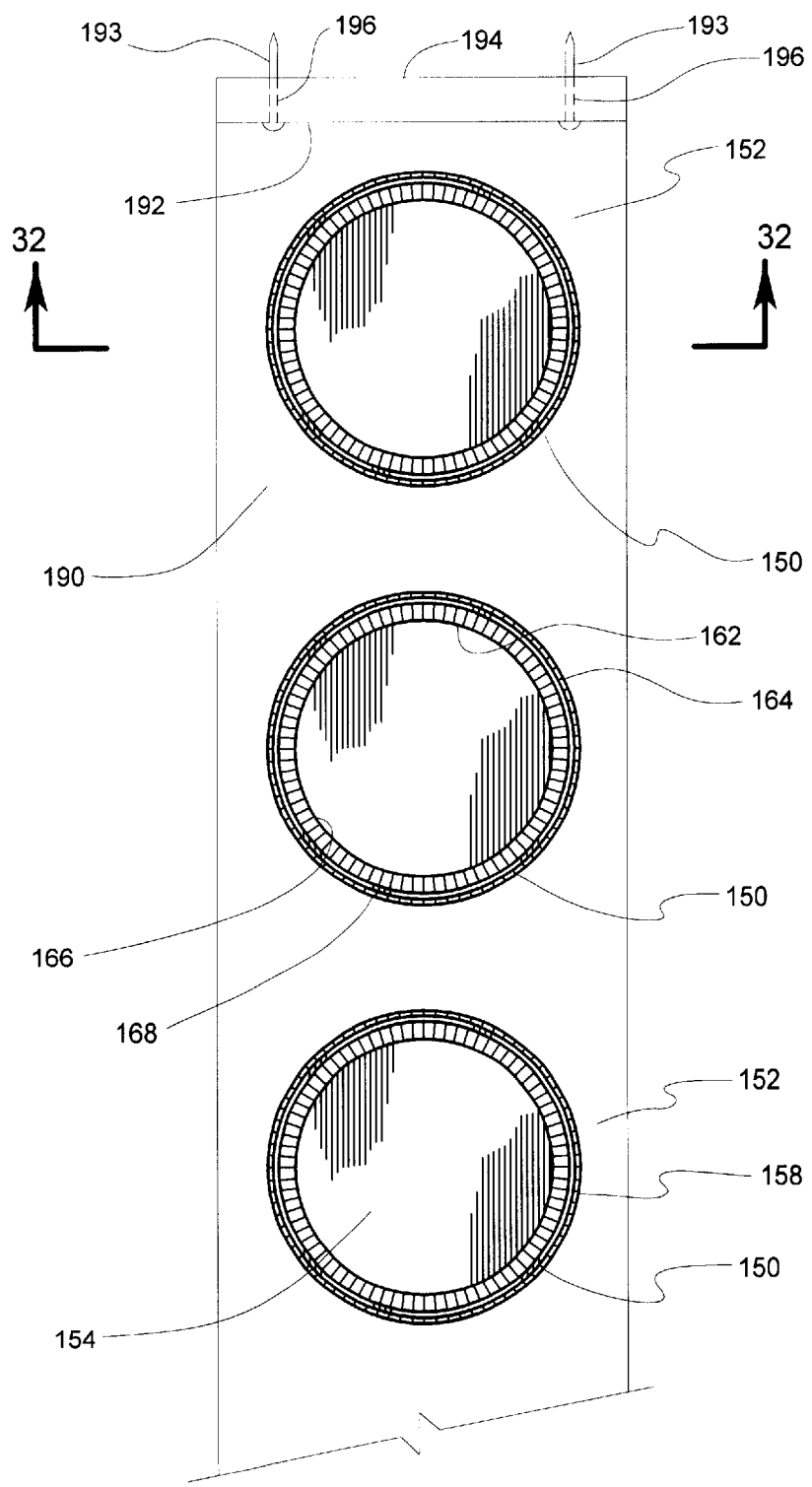
FIG. 31 is a top elevation view of a flat plate having a plurality of connecting rings integrally joined thereto that ultimately receive a cooperating portion of a second member in accordance with the present invention.

Referring now to FIGS. 10–16, the second member 18 includes inner and outer cylindrical side walls 60 and 62 that define an annular rim or top wall 64, and a planar bottom wall 66. The frustum portion 24 of the second member 18 includes an annular configuration having a diameter relatively larger than the diameter of the outer cylindrical wall 28 of the cylindrical portion 14, and an arcuate or protruding inner annular wall 68 or "button" having a diameter slightly smaller than the inner cylindrical wall 26 of the cylindrical portion 14. The frustum portion 24 engagingly receives the entire surface of the cutting wall 32 of the cylindrical portion 14 when the first member 12 is inserted into the second member 18 such that the cylindrical and frustum portions 14 and 24 are coaxially aligned, and the arcuate portion 16 is positioned adjacent to the long side portion 22 of the lower wall 19. The diameter of the protruding inner wall 68 allows the frustum portion 24 to insert snugly into the cavity 30 of the cylindrical portion 14, thus defining a recess or "dimple". (not shown) in the baking dough that, after baking the dough, results in a bread roll with a "flatter," relatively annular center portion 67 (see FIG. 18) which corresponds to the annular center portion 4 of a bread roll resulting from baking dough positioned in an overhand knot configuration as depicted in FIG. 2. Should a more rounded or "mushroom" configured annular center portion 67 be required, the protruding annular wall 68 would be deleted and a planar frustum portion 24 utilized to provide the desired center portion 67, configuration.

The frustum portion 24 is positioned inside the second member 18 a vertical distance from the top wall 64 equal to substantially about one-half the longitudinal dimension of the inner wall 26 of the cylindrical portion 14. Further, the frustum portion 24 is positioned adjacent to the inner cylindrical wall 60 of the second member 18 thereby inclining the short side portion 20 only slightly relative to the frustum portion 24, and inclining the long side portion 22 substantially about twenty-five degrees in relation to the frustum portion 24 to promote congruent engagement between the inclined dough cutting edge 58 of the arcuate portion 16 and the long side portion 22. The length and inclination of the short and long side portions 20 and 22 in relation to the frustum portion 24, cooperate with corresponding cylindrical and arcuate cutting edges 34 and 58 of the first member 12, to produce a bread roll 70 (FIG. 18) with a surface that includes a relatively annular surface depression 69 being "offset" to one side of the roll 70, and an arcuate surface depression or "tail" 72 extending from the annular depression 69 to an opposite side of the roll 70. The annular and arcuate depressions 69 and 72 allow the bread roll 70 to be separated into predetermined eatable portions. Separating the roll 70 into predetermined portions, is made easier by the enlarged base portion 44 of the first member 12. The base portion 44 defines a relatively triangular separation near the center of the configured dough resulting in a substantially triangular depression 74 near the center of the baked roll 70 that allows two relatively large arcuate portions 76 and 78 of the roll 70 to be easily split apart, comparable to the large arcuate portions 80 and 82 of the prior art roll of FIG. 1.

Figure 17:
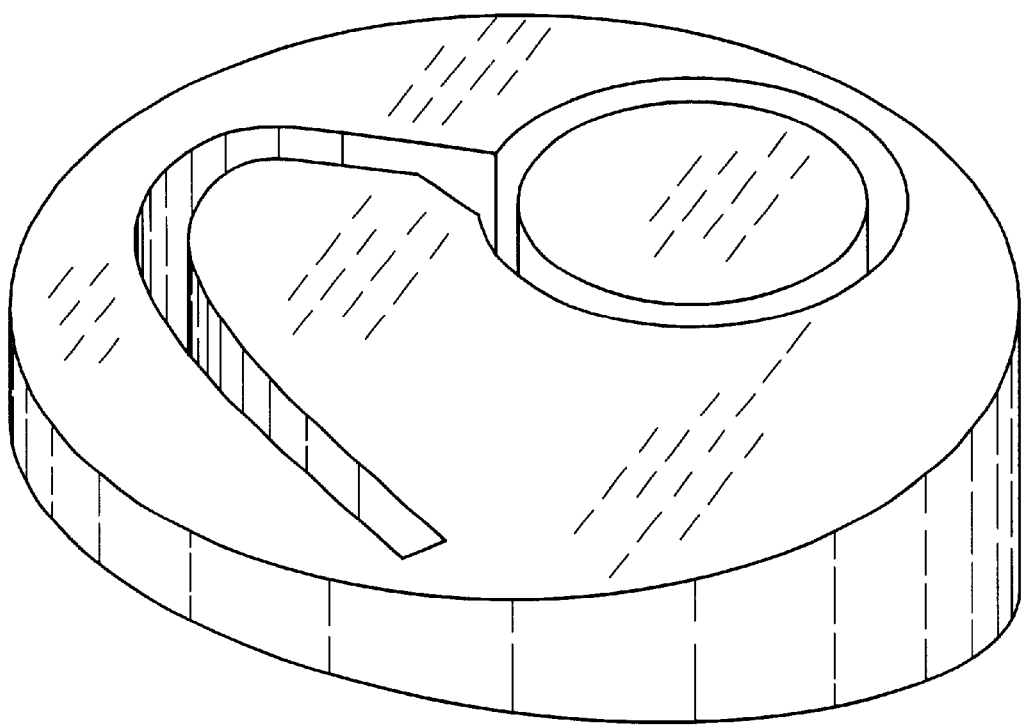
FIG. 17 is a perspective view of baking dough configured in accordance with the present invention.

In operation, the bottom wall 66 of the second member 18 is set upon a level support surface and a predetermined quantity of baking dough is placed inside the inner cavity 21 of the second member 18 such that a substantially portion of the lower wall 19 is covered with baking dough. The baking dough is then leveled. The first member 12 is then forcibly urged by a person's hand to engage and separate the dough until the cutting edges 34 and 58 of the cylindrical and arcuate portions 14 and 16 engage corresponding frustum and long side portions 24 and 22 of the lower wall 19 such that the cylindrical and frustum-portions 14 and 24 are coaxially aligned. The first member 12 is then removed from the second member 18 while maintaining coaxial alignment between the cylindrical and frustum portions 14 and 24. The separation distances imposed upon the baking dough is sufficiently large to maintain a predetermined distance of separation after the second member 18 has been completely removed from the dough (FIG. 17). The separated dough, upon being baked, provides a roll with a predetermined surface configuration (FIG. 18) equivalent to the surface configuration of a prior art roll (FIG. 1) resulting from baking dough that has been maneuvered into an "overhand knot" position (FIG. 2).

Referring to FIGS. 19–30, an alternative embodiment of the device 10 in accordance with the present invention is illustrated. The alternative device 110 is depicted with the first member 12 being integrally joined to a machine connection member 112, and the second member 18 being reconfigured to include first and second recesses 114 and 116 positioned in the bottom planar wall 66, and a third recess 118 positioned in the outer cylindrical side wall 62 with a metal aligning stud 119 secured to the top wall 64 in line with the midpoint of the third recess 118 when taking a side elevation view of the second member 18. The aligning stud 119 promotes fast integration of the second member 18 with a mass production dough configuration machine (not shown) which also removably receives the first member 12. The alternative embodiment 110, after being secured to the mass production machine, operates essentially the same as the above described device 10 when configuring the baking dough.

Referring to FIGS. 21–26, the connection member 112 includes a translucent, disk shaped support member 120 having a cylindrical side wall 122 that defines top and bottom walls 123 and 125 with diameters substantially equal to the diameter of the cylindrical inner wall 60 of the second member 18. The connection member 112 further includes a threaded orifice 124 positioned in the support member 120 such that the orifice 124 is coaxially aligned with the frustum portion 24 of the second member 18, and a threaded bushing 126 inserted into the threaded orifice 124. The bushing 126 includes a pin receiving orifice 128 that forcibly receives a connecting pin 130 therein such that a sufficient amount of the pin 130 protrudes above the top wall 123 of the support member 120 to allow a machine connecting orifice 132 to laterally extend there-through. The orifice 132 ultimately receives a machine connecting rod (not shown) that removably attaches the connecting pin 130 to the mass production machine that produces the configured baking dough which is baked to provide rolls with surface configurations substantially similar to roll surfaces resulting from dough tied into an overhand knot configuration.

Referring to FIGS. 27–30, the first and second recesses 114 and 116 of the second member 18 are orientated in a relatively "L" shaped, channel configuration with the recesses 114 and 116 extending into the bottom wall 66 a common depth that allows the second member 18 to engage corresponding portions of the aforementioned mass production machine to enable the machine to grasp and move the second member 18. The first recess 114 is perpendicular to the second recess 116, and positioned parallel to a second member 18 diameter line 134 (FIGS. 12 and 30) drawn through the center of the frustum portion 24 and the metal stud 119. The second recess 116 is perpendicular to the diameter line 134, and positioned to form a relatively small segment 136 in the bottom wall 66 that includes an inclined portion 138 integrally joined to a portion of the bottom wall 66 between the second recess 116 and the inclined portion 138. The third recess 118 is a substantially square configured depression in the cylindrical outer side wall 62 of the second member 18. The third recess 118 is positioned relatively closer to the top wall 64 compared to the bottom wall 66. The third recess 118 includes a pair of first sides 140 parallel to the top wall 64, and a pair of second sides 142 perpendicular to the top wall 64. The function of the third recesses 118 is to quickly locate the front portion of the second member 18 when engaging a corresponding portion of the mass production machine to quickly secure the second member 18 to the machine.

Referring now to FIGS. 31–34, a modification of the second member 18 detailed above is illustrated in an alternative device 146; the modified second member is denoted by the numeral 148. The modified second member 148 is designed to be quickly connected or disconnected to a connecting member or ring 150 that is welded to a flat plate 152 which is secured to the mass production machine. The flat plate 152 is dimensioned to receive one or more connecting rings 150 in substantially a lineal array such that there is sufficient separation between adjacent rings 150 to allow for the unencumbered installation or removal of the second members 148 upon the connecting rings 150.

The connecting rings 150 and flat plate 152 are fabricated from a non-corroding metal such as anodized aluminum. The connecting rings 150 have an annular configuration, when taking a top view of the ring 150, and include planar top and bottom walls 154 and 156, and an outer cylindrical side wall 158. The outer side wall 158 includes an annular recess 160 circumferentially positioned around the connecting ring 150 at substantially the mid-portion of the side wall 158 to ultimately receive a portion of the second member 148 that secures the second member 148 to the connecting ring 150. The top wall 154 has an annular ridge 162, when taking atop view of the ring 150, integrally joined to the perimeter of the top wall 154. The ridge 162 has a relatively trapezoidal configuration, when taking a side sectional view of the ring 150, with a short side wall 164 adjacent to the perimeter of the ring 150, an opposing long side wall 166 and a planar top wall 168 positioned therebetween. The ridge walls 164, 166 and 168 cooperate with corresponding portions of the second member 148 to receive and stabilize the second member 148 upon engaging and being detachably secured to the connecting ring 150.

The modified second member 148 has substantially the same top surface configuration as the original second member 18 detailed above, however, due to the modified second member 148 being fabricated from an injection molding process, the lower surface 172 has been reconfigured to extend parallel to the top surface with a support web 174 being utilized to maintain the position of the inclined long side 176 of the second member 148 during the dough cutting operation. The modified second member 148 includes inner and outer cylindrical side walls 178 and 180 that are dimensioned to form a relatively flexible annular outer rim 182 that positions a bottom wall 183 of the rim 182 parallel to and in planar alignment with the bottom wall 156 of the ring connector 150. The modified second member 148 further includes a horizontal planar bottom wall 186 that engages the top wall 154 of the connecting ring 150. A locking lip 184 protrudes from the inner side wall 178 adjacent to the rim 182 to congruently engage the annular recess 160 in the side wall of the ring connector 150 when sufficient manual force is urged upon the top surface 170 of the second member 148 to forcibly move the locking lip 184 across the short side 164 of the annular ridge 162 and an upper portion of the cylindrical side wall 158 of the connecting ring 150 thereby retaining the position of the second member 148 upon the connecting ring 150 until sufficient manual force is utilized to remove the second member 148 from the ring 150.

Figure 32:
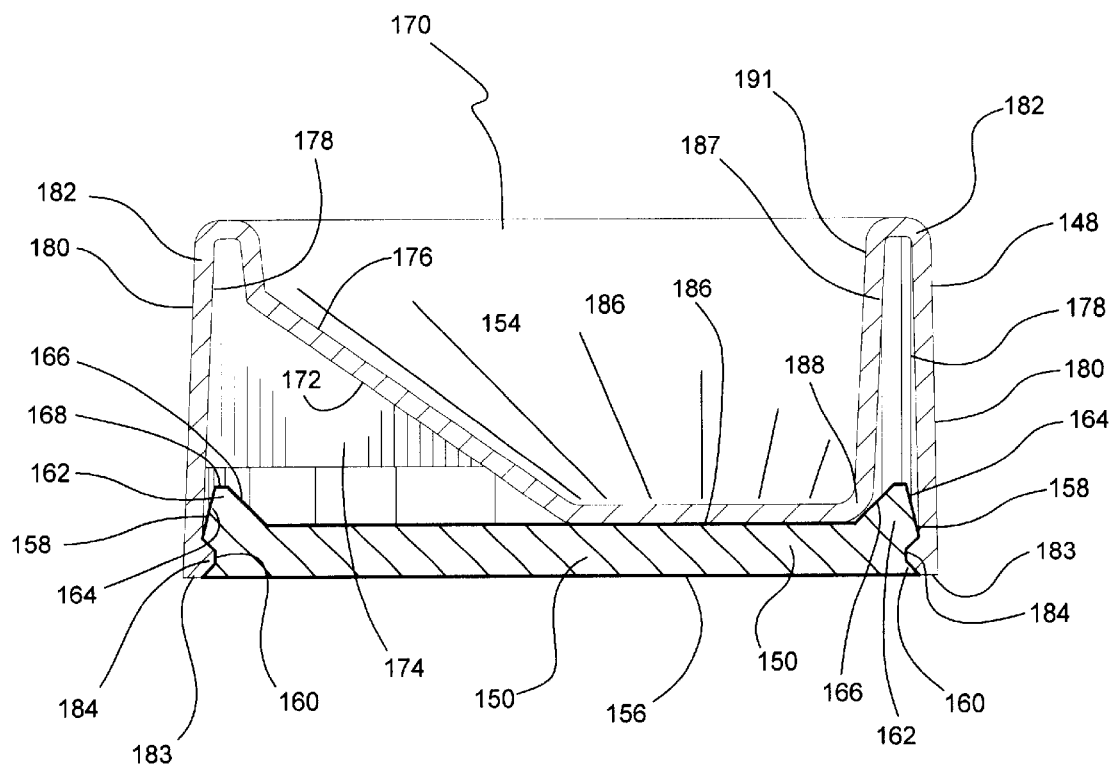
FIG. 32 is a sectional view taken along line 32—32 of FIG. 31.
Figure 33:
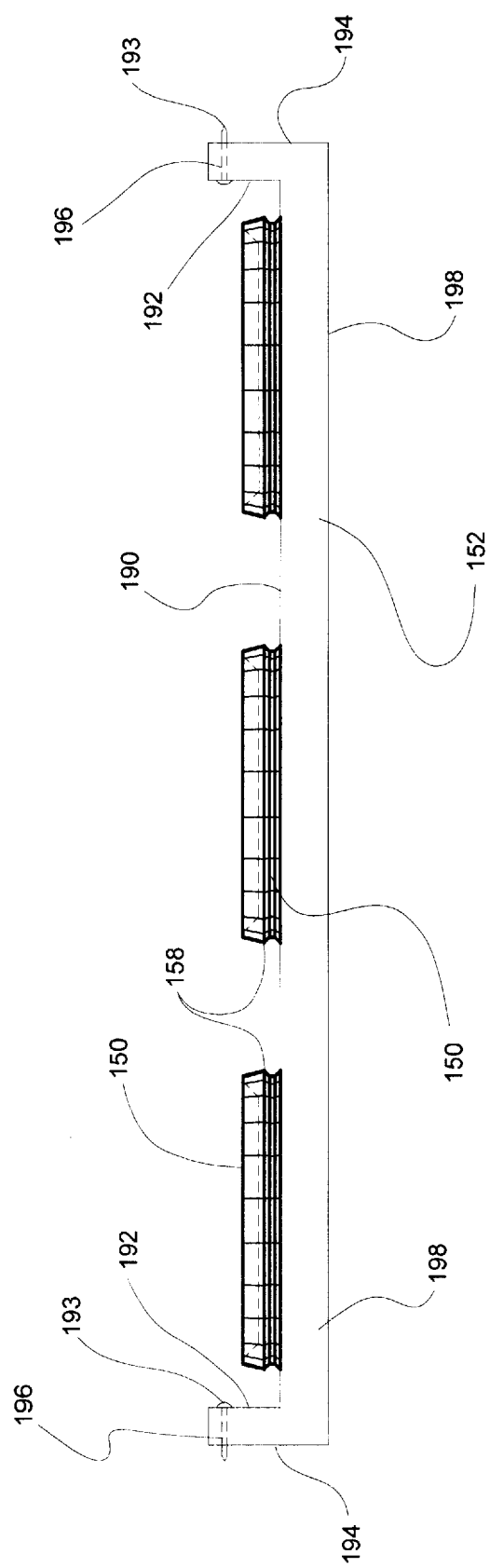
FIG. 33 is a side elevation view of the flat plate and connecting rings of FIG. 31.
Figure 34:
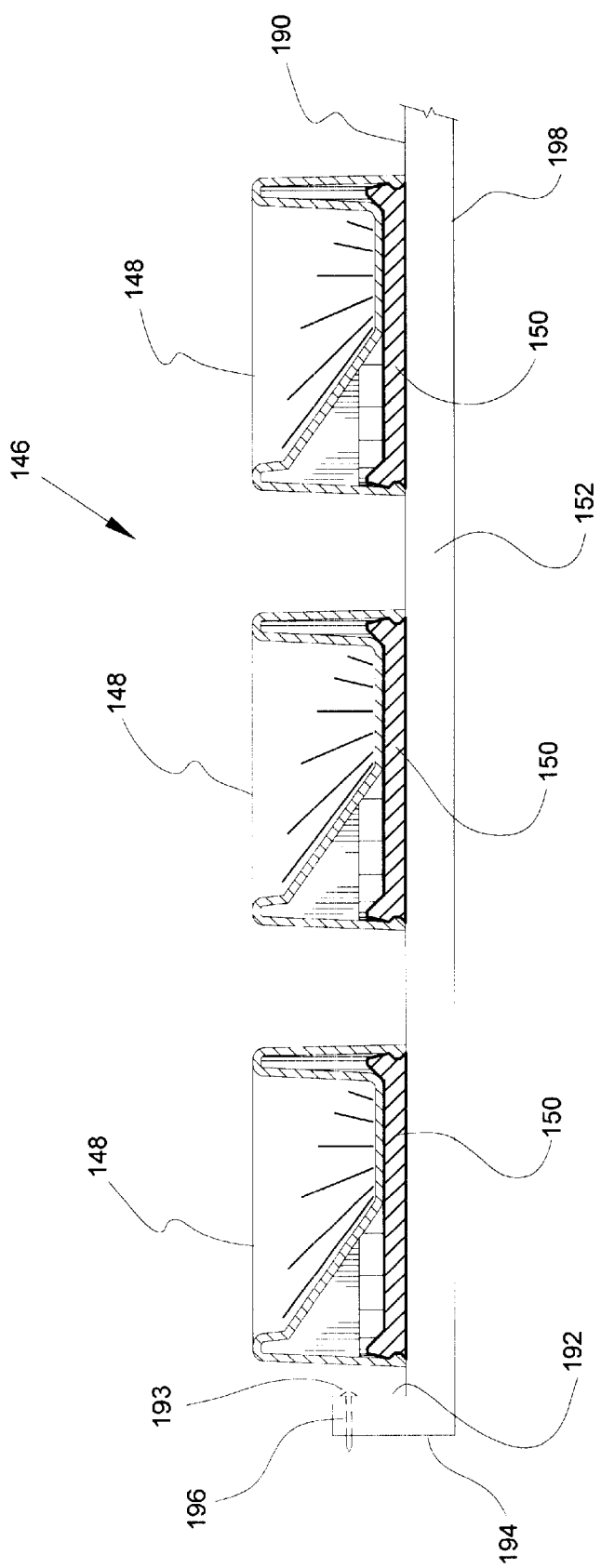
FIG. 34 is a side sectional view of the connecting rings of FIG. 33 with the second member of FIG. 32 secured to each of the connecting rings.

Referring to FIG. 32, the modified second member 148 further includes a partial inner cylindrical rim 187 that is integrally joined to and diverges slightly from the outer rim 182. The inner rim 187 is configured to position a lower curved portion 188 that joins a frustum portion 189 with a short side portion 191, adjacent to a lower portion of the long side 166 of the annular ridge 162. The lower portion 188 stabilizes the second member 148 when the modified second member 148 is forcibly positioned upon the connecting ring 150. Stabilization occurs due to the resilient return force or "gripping" force generated by the forcible separation of ridge engaging portions of the outer and inner rims 182 and 187 by the annular ridge 162 which has a base dimension relatively larger than the distance separating the ridge engaging portions.

The flat plate 152 is a relatively "thin" piece of anodized aluminum having a planar upper surface 190 dimensioned to receive a predetermined quantity of connecting rings 150 such that the bottom wall 156 of each ring 150 is welded to the upper surface 190 with sufficient separation between the rings 150 to provide for the unobstructed attachment of modified second members 148 to adjacent rings 150. Longitudinally opposed side walls 192 are integrally joined to corresponding lateral ends 194 of the flat plate 152 such that the walls 192 are separated from adjacent rings 150 a distance sufficient to allow the unobstructed attachment of the second members 148 to the corresponding rings 150. The side walls 192 include machine connection apertures 196 extending laterally through the walls 192 to removably receive a connecting fasteners 193 that ultimately connect the flat plate 152 to a portion of the mass production machine that forcibly moves the plate 152 through the cutting stage of the dough configuration process until ultimately the dough is deposited for conditioning. The flat plate 152 further includes a planar lower surface 198 that sets upon a corresponding portion (not shown) of the mass production machine as the plate 152 is moved through the dough configuration process.

In operation, a predetermined quantity of connecting rings 150 are welded to a planar upper surface 190 of the flat plate 152 which is dimensioned to accommodate the bottom walls 183 of the rims 182 of the modified second members 148. The flat plate 152 is positioned upon and movably secured to the mass production machine. Modified second members 148 are manually forced upon the connecting rings 150 by pushing upon the top surface 170 to correspondingly force the locking lips 184 of the rims 182 into recesses 160 in the side walls 158 of the connecting rings 150. The modified second members 148 are then manually rotated upon the connecting rings 150 until the top surfaces 170 of the second members 148 are orientated to receive corresponding cutting edges 34 and 58 (see FIGS. 3–9) of the cylindrical and arcuate portions 14 and 16 of the first members 12 which have been removably secured to corresponding portions of the mass production machine. A predetermined quantity of baking dough is positioned in each second member 148 such that the surface of the dough is substantially planar. The mass production machine is then powered to horizontally move the flat plate 152 under the first members 12 to allow the machine to urge the first members 12 down into the modified second members 148 until the cutting edges 34 and 58 engage corresponding portions of the second member 148, thus cutting each piece of dough into a preselected configuration. The machine then removes the first members 12 from the second members 148; the dough remaining in the same position in the second member 148 as before the cutting operation. The machine then horizontally moves the flat plate 152 beyond the first members 12 to a position where the configured dough can be deposited for placement into an environmental chamber, where the dough is conditioned before being baked to ultimately form bread rolls having a predetermined configuration.

The foregoing description is for purpose of illustration only and is not intended to limit the scope. Of protection accorded this invention. The scope of protection is to be measured by the following claims, which should be interpreted as broadly as the inventive contribution permits.

What is claimed is:

1. A device that cooperates with a machine that configures a plurality of portions of baking dough comprising:
   a plurality of first members correspondingly configured to a predetermined baking dough configuration;
   means for removably securing said first members to the machine; and
   a plurality of second members each having a top surface that cooperates with a corresponding first member to configure the portions of baking dough, said second members each having a bottom surface configured to detachably engage a corresponding connecting member secured to a flat element that is moved by the machine.

2. The device of claim 1 wherein said first member includes a cylindrical portion integrally joined to an arcuate portion.

3. The device of claim 2 wherein said cylindrical portion includes an inner wall having a predetermined diameter and an outer wall having a diameter relatively larger than said inner wall diameter thereby configuring an inner cavity within said cylindrical portion.

4. The device of claim 2 wherein said cylindrical portion includes an axial dimension relatively longer than the longitudinal dimension of said arcuate portion.

5. The device of claim 3 wherein the radial distance separating said inner wall from said outer wall of said cylindrical portion is substantially about three-sixteenths inches.

6. The device of claim 2 wherein said cylindrical portion includes a tapered end portion to separate the bakery dough.

7. The device of claim 2 wherein said arcuate portion includes a tapered end portion to separate the bakery dough.

8. The device of claim 2 wherein said arcuate portion of said first member further includes a short side integrally joined to said cylindrical portion, and an adjacent long side substantially greater in length than said short side.

9. The device of claim 8 wherein said short side of said arcuate portion is perpendicular to the longitudinal axis of said cylindrical portion of said first member.

10. The device of claim 8 wherein said long side of said arcuate portion is parallel to the longitudinal axis of said cylindrical portion of said first member.

11. The device of claim 2 wherein said arcuate portion includes an enlarged section joining said arcuate portion to said cylindrical portion, said enlarged section separating a corresponding portion of the dough to ultimately provide a baked roll having a predetermined configuration.

12. The device of claim 2 wherein said arcuate portion includes a relatively straight lower section, when taking a side elevation view, that cooperates with a relatively steep sloping lower section to ultimately engage corresponding portions of said inner wall of said second member thereby separating corresponding portions of said dough to provide a baked roll having a predetermined configuration.

13. The device of claim 1 wherein said removable securing means includes a machine connection member comprising:
   a disk shaped support member having a cylindrical side wall that defines top and bottom walls with diameters substantially equal to the diameter of a cylindrical inner wall of said second member;
   a threaded orifice disposed in said support member such that said orifice is coaxially aligned with a frustum portion of said second member; and
   a threaded bushing inserted into said threaded orifice.

14. The device of claim 13 wherein said bushing includes a pin receiving orifice that forcibly receives a connecting pin therein such that a sufficient amount of the pin protrudes above a top wall of said support member to allow a machine connecting orifice to laterally extend therethrough to ultimately receive a machine connecting rod that removably attaches said connecting pin to the machine.

15. The device of claim 1 wherein said second member includes first and second recesses positioned in a bottom planar wall.

16. The device of claim 15 wherein said second member includes a third recess disposed in an outer cylindrical side wall with a metal aligning stud secured to a top wall in line with the midpoint of said third recess when taking a side elevation view of said second member.

17. The device of claim 1 wherein said second member includes a lower surface configured to extend parallel to a top surface.

18. The device of claim 17 wherein said second member includes a support web utilized to maintain the position of a long side of said second member during a dough cutting operation.

19. The device of claim 1 wherein said second member includes inner and outer cylindrical side walls that are dimensioned to form a relatively flexible annular outer rim that disposes a bottom wall of said rim parallel to and in planar alignment with said bottom wall of said connecting member.

20. The device of claim 19 wherein said second member includes a horizontal planar bottom wall that engages a top wall of said connecting member.

21. The device of claim 20 wherein said second member includes a locking lip protruding from an inner side wall adjacent to said rim to congruently engage an annular recess in a side wall of said connecting member.

22. The device of claim 21 wherein said second member includes a partial inner cylindrical rim that is integrally joined to and diverges slightly from said outer rim.

23. The device of claim 22 wherein said inner cylindrical rim is configured to position a lower curved portion that joins a frustum portion with a short side portion, adjacent to a lower portion of a long side of an annular ridge.

24. The device of claim 27 wherein said connecting member includes a cylindrical outer side wall with a circumferential recess that removably receives a locking lip portion of said second member.

25. The device of claim 1 wherein said connecting member includes a top wall portion that engages a bottom wall of said second member.

26. The device of claim 1 wherein said element includes a flat plate removably secured to the machine.

27. The device of claim 26 wherein said flat plate includes opposing side walls having apertures therethrough that ultimately receive connecting screws that secure said flat plate to a corresponding portion of the machine.

28. A method for configuring a plurality of bakery dough portions, said method comprising the steps of:
   A. providing a plurality of first members correspondingly configured to predetermined bakery dough configurations;
   B. removably securing said first members to a machine that configures a plurality of bakery dough portions;
   C. providing a plurality of second members each having a top surface that cooperates with a corresponding first member to configure the portions of bakery dough, said second members each having a bottom surface configured to detachably engage a corresponding connecting member secured to a flat element that is moved by the machine;
   D. placing a predetermined quantity of bakery dough into said second members;
   E. forcibly inserting said first members into said second members until the cutting edges of said first members engage corresponding portions of said second members to cut the bakery dough into dough portions; and
   F. extracting the first members from the cut dough and the second members to thereby produce a plurality of dough portions.

29. A method for combining a dough configuration device and a machine whereby a plurality of bakery dough portions are configured, said method comprising the steps of:
   A. providing a plurality of first members having predetermined configurations;
   B. securing said first members to the machine; and
   C. providing a plurality of second members each having a top surface that cooperates with a corresponding first member to configure the bakery dough portions, said first members ultimately being urged by the machine through the bakery dough portions, said second members each having a bottom surface configured to detachably engage a corresponding connecting member secured to a flat element that is moved by the machine.

30. A device that configures a plurality of bakery dough portions comprising:
   plurality of first members having predetermined configurations, said first members being secured to a preselected machine; and
   a plurality of second members each having a top surface that cooperates with a corresponding first member to configure the bakery dough portions, said second members each having a bottom surface configured to detachably engage a corresponding connecting member secured to a flat element that is moved by the preselected machine, said first members being forcibly urged by the preselected machine through bakery dough portions disposed in said second members, said first members ultimately being extracted from the bakery dough portions whereby a plurality of bakery dough portions are configured and ultimately separated from said second members.

* * * * *